United States Patent
Irie et al.

(10) Patent No.: US 9,760,974 B2
(45) Date of Patent: Sep. 12, 2017

(54) INFORMATION PROCESSING METHOD, INFORMATION PROCESSING DEVICE, AND PROGRAM

(71) Applicants: Hironori Irie, Tokyo (JP); Toshiyuki Terashita, Tokyo (JP); Tomohiko Sasaki, Tokyo (JP)

(72) Inventors: Hironori Irie, Tokyo (JP); Toshiyuki Terashita, Tokyo (JP); Tomohiko Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/924,871

(22) Filed: Oct. 28, 2015

(65) Prior Publication Data
US 2016/0048942 A1 Feb. 18, 2016

Related U.S. Application Data

(63) Continuation of application No. PCT/JP2015/057609, filed on Mar. 10, 2015.

(30) Foreign Application Priority Data

Mar. 18, 2014 (JP) ................................ 2014-054782

(51) Int. Cl.
*G09G 5/00* (2006.01)
*G06T 3/00* (2006.01)
(Continued)

(52) U.S. Cl.
CPC .......... *G06T 3/0018* (2013.01); *G06F 3/0488* (2013.01); *G06F 3/04845* (2013.01);
(Continued)

(58) Field of Classification Search
CPC ......... G06T 11/60; G06T 19/00; G06T 11/00; G06F 9/4443; G06F 3/0481
See application file for complete search history.

(56) References Cited

U.S. PATENT DOCUMENTS 5,341,466 A * 8/1994 Perlin .................... G06T 3/0025
345/428
6,121,966 A * 9/2000 Teodosio .............. G06F 3/0481
715/799
(Continued)

FOREIGN PATENT DOCUMENTS

JP H06-325144 11/1994
JP H10-340075 12/1998
(Continued)

OTHER PUBLICATIONS

International Search Report Issued on May 12, 2015 in PCT/JP2015/057609 filed on Mar. 10, 2015.
(Continued)

*Primary Examiner* — Abderrahim Merouan
(74) *Attorney, Agent, or Firm* — IPUSA, PLLC

(57) ABSTRACT

An information processing method for causing a computer to process an image, wherein the image processing method causes the computer to execute an acquisition step of acquiring the image, a first production step of producing an editing image for editing at least a portion of the image and a first changing image for changing the editing image to be output, an editing step of editing the image on the produced editing image, a second production step of producing a second changing image based on an image edited at the editing step, and an output step of outputting an output image that has at least the editing image and the second changing image.

16 Claims, 31 Drawing Sheets

(51) Int. Cl.
| | |
|---|---|
| *G06F 3/0488* | (2013.01) |
| *G06T 11/00* | (2006.01) |
| *G06F 3/0484* | (2013.01) |
| *H04N 5/225* | (2006.01) |
| *H04N 5/232* | (2006.01) |
| *G06T 11/60* | (2006.01) |
| *G06T 19/00* | (2011.01) |
| *G06F 9/44* | (2006.01) |
| *G06F 3/0481* | (2013.01) |

(52) U.S. Cl.
CPC ............... *G06T 3/00* (2013.01); *G06T 11/00* (2013.01); *G06T 11/60* (2013.01); *H04N 5/2258* (2013.01); *H04N 5/23216* (2013.01); *H04N 5/23238* (2013.01); *H04N 5/23293* (2013.01); *G06F 3/0481* (2013.01); *G06F 9/4443* (2013.01); *G06T 19/00* (2013.01)

(56) References Cited

U.S. PATENT DOCUMENTS

| | | | | |
|---|---|---|---|---|
| 7,149,549 | B1* | 12/2006 | Ortiz | H04N 5/232 348/211.2 |
| 7,437,684 | B2* | 10/2008 | Maille | G06T 13/40 345/473 |
| 7,620,909 | B2* | 11/2009 | Park | H04N 5/232 345/592 |
| 8,214,766 | B1 | 7/2012 | Berger et al. | |
| 8,548,778 | B1* | 10/2013 | Hart | G06T 19/20 600/416 |
| 9,025,044 | B2* | 5/2015 | Fukuya | H04N 5/23216 345/625 |
| 2005/0278636 | A1 | 12/2005 | Nomoto | |
| 2007/0070473 | A1 | 3/2007 | Lu et al. | |
| 2007/0183000 | A1* | 8/2007 | Eisen | H04N 1/00864 358/452 |
| 2008/0165141 | A1 | 7/2008 | Christie | |
| 2008/0212900 | A1 | 9/2008 | Ogawa | |
| 2008/0247636 | A1* | 10/2008 | Davis | G06T 19/00 382/152 |
| 2009/0160996 | A1* | 6/2009 | Yamaoka | G06T 5/006 348/333.11 |
| 2009/0256947 | A1* | 10/2009 | Ciurea | G06F 3/0488 348/333.12 |
| 2010/0162163 | A1* | 6/2010 | Wang | G06F 3/04845 715/800 |
| 2010/0173678 | A1 | 7/2010 | Kim et al. | |
| 2011/0280475 | A1 | 11/2011 | Singhal et al. | |
| 2012/0147053 | A1* | 6/2012 | Yamamoto | G06T 11/60 345/667 |
| 2012/0200665 | A1* | 8/2012 | Furumura | G06T 3/4038 348/36 |
| 2013/0169660 | A1 | 7/2013 | Li et al. | |
| 2013/0230259 | A1 | 9/2013 | Intwala et al. | |
| 2013/0235071 | A1 | 9/2013 | Ubillos et al. | |
| 2013/0325493 | A1* | 12/2013 | Wong | G06F 19/345 705/2 |
| 2013/0326419 | A1 | 12/2013 | Harada et al. | |
| 2014/0068499 | A1 | 3/2014 | Yoo et al. | |
| 2014/0109046 | A1* | 4/2014 | Hirsch | G06F 9/44 717/120 |
| 2014/0184821 | A1 | 7/2014 | Taneichi et al. | |
| 2014/0184858 | A1* | 7/2014 | Yu | H04N 5/23293 348/241 |
| 2014/0194164 | A1 | 7/2014 | Lee et al. | |
| 2015/0046299 | A1* | 2/2015 | Yan | G06Q 10/087 705/28 |
| 2016/0050369 | A1* | 2/2016 | Takenaka | H04N 1/387 348/222.1 |

FOREIGN PATENT DOCUMENTS

| | | |
|---|---|---|
| JP | 2003-018561 | 1/2003 |
| JP | 2003-132348 | 5/2003 |
| JP | 2003132362 A * | 5/2003 |
| JP | 2005-195867 | 7/2005 |
| JP | 2011-076249 | 4/2011 |
| JP | 2012-029179 | 2/2012 |
| JP | 2014-006880 | 1/2014 |
| JP | 2014-010611 | 1/2014 |
| JP | 2014-131215 | 7/2014 |
| WO | 2011/055451 | 5/2011 |

OTHER PUBLICATIONS

Japanese Office Action dated Jul. 21, 2015.
Office Action dated Mar. 24, 2016 issued to related U.S. Appl. No. 14/924,890.
Office Action dated Aug. 24, 2016 issued to related U.S. Appl. No. 14/924,890.
Japanese Office Action dated Sep. 13, 2016.
Japanese Office Action dated Aug. 30, 2016.
Dias: "Das Scannen von Bildern", Dec. 31, 2007 (Dec. 31, 2007), XP055325138, Retrieved from the Internet: URL: https://web.archive.org/web/20130717162821/http://www.chem.uni-potsdam.de/groups/pools/Anleitungen/gimp.pdf [retrieved on Dec. 1, 2016] * the whole document *, with English concise explanation.
Extended European Search Report dated Dec. 9, 2016.
Canadian Office Action for 2,941,469 dated Jan. 25, 2017.

* cited by examiner

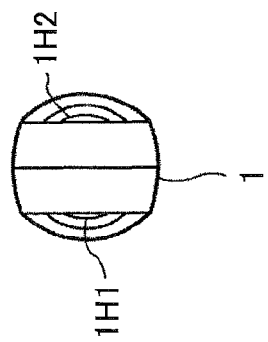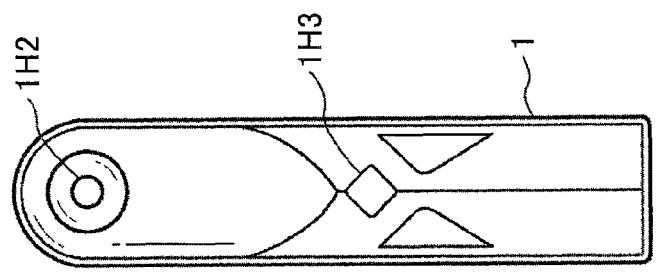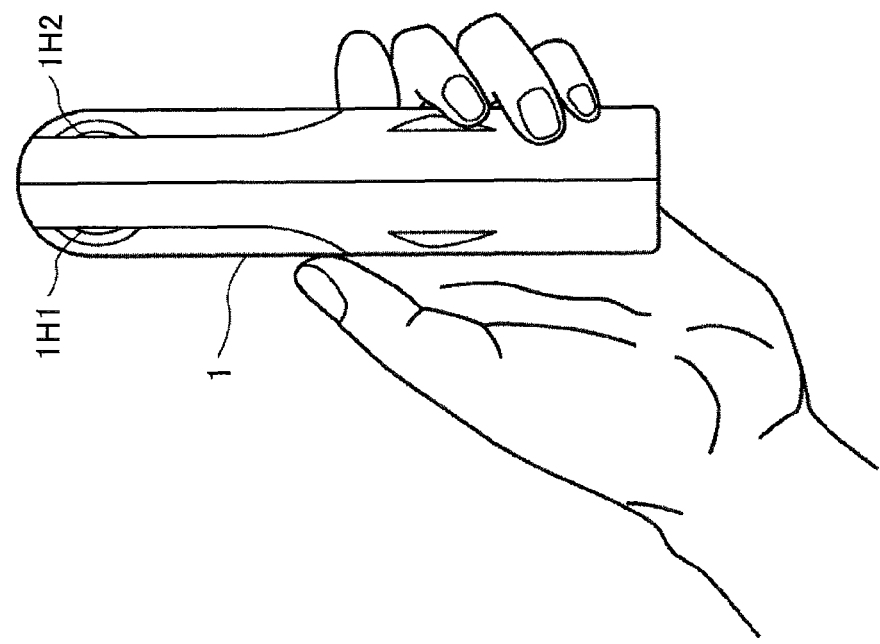

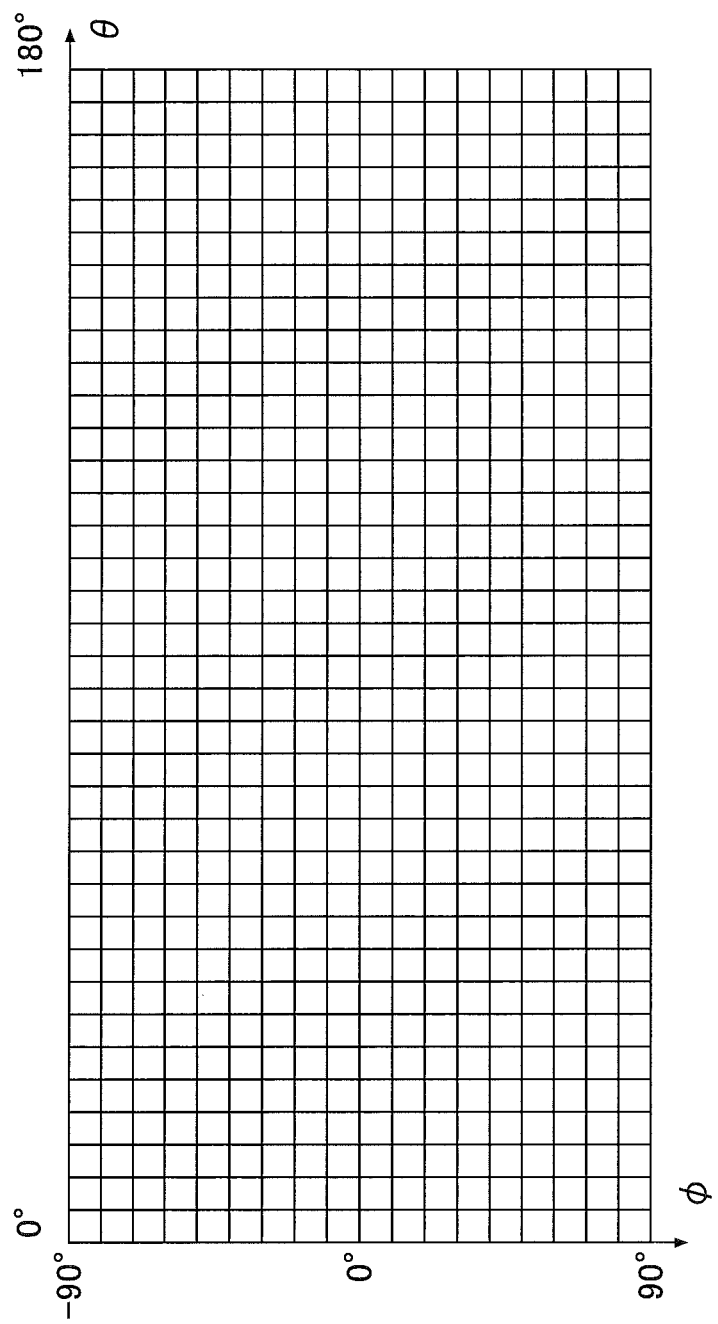

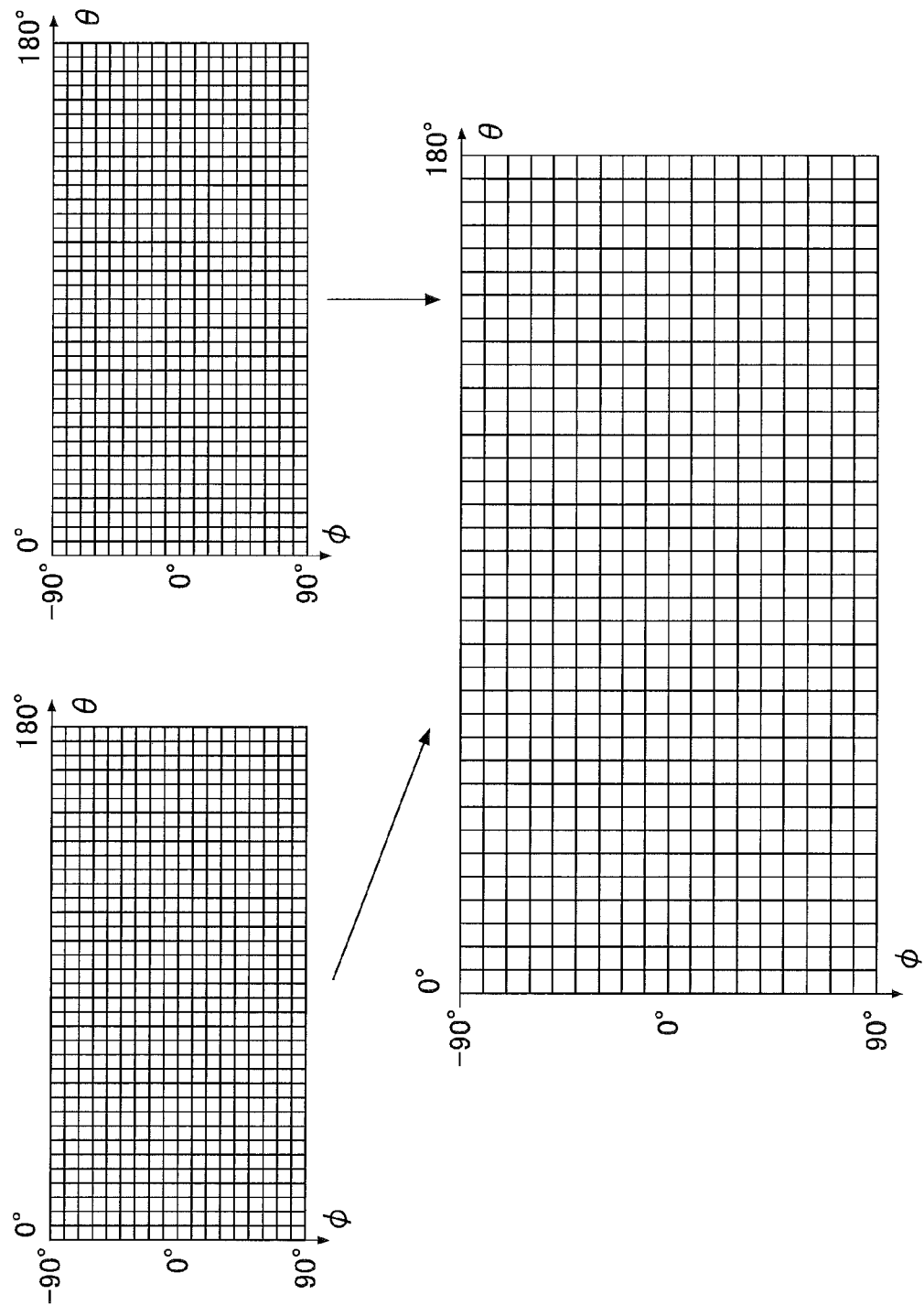

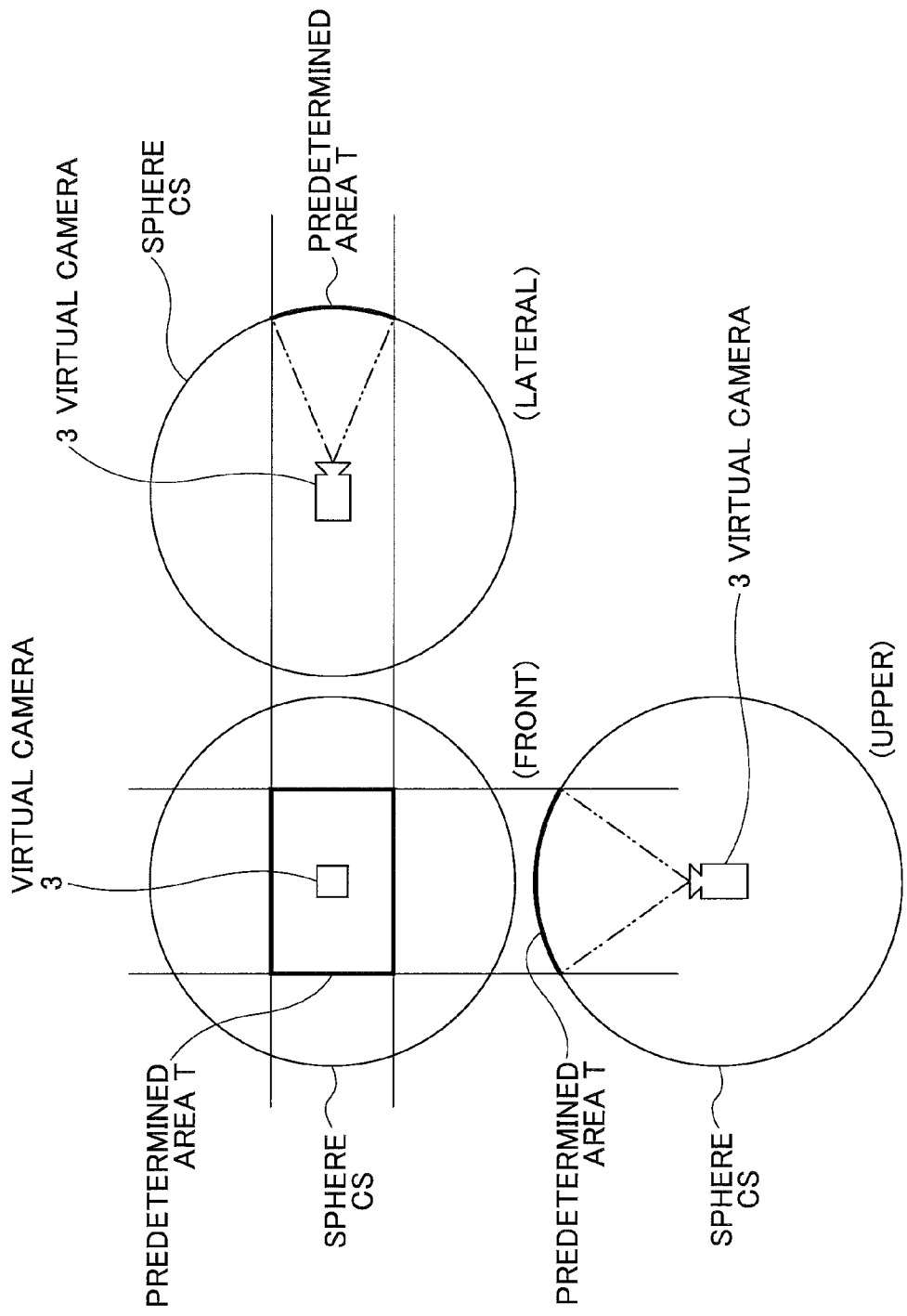

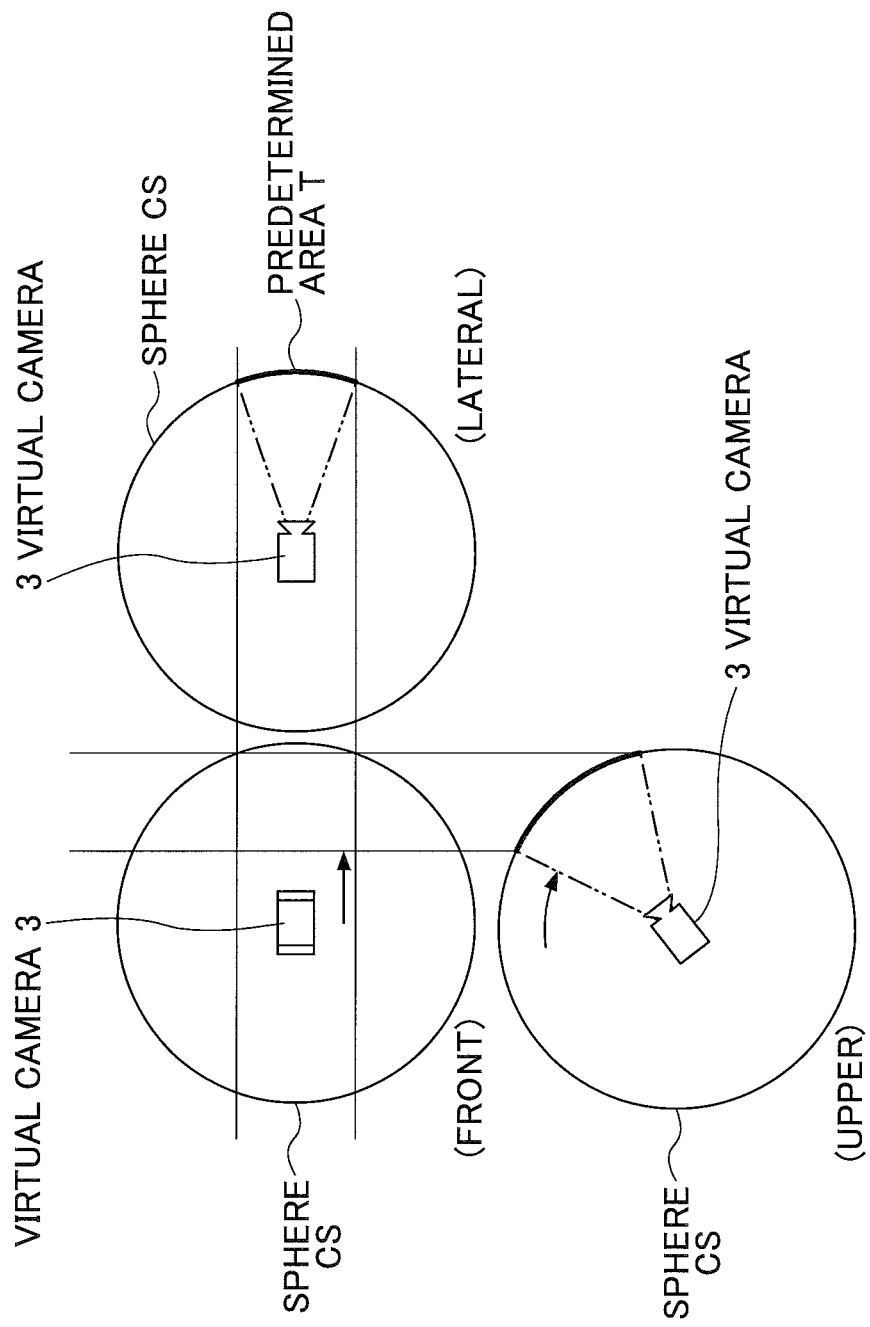

FIG.15

| RANGE | OUTPUT MAGNIFICATION | ZOOM SPECIFICATION VALUE ZP | ANGLE OF VIEW ω | CHANGING PARAMETER | | REMARKS |
|---|---|---|---|---|---|---|
| A~B | viewWH/imgWH*imageDeg/ω | 60~120 ω=ZP | 60°~120° | d=0~1 | d=ω/60−1 | MOVEMENT IN SPHERE FIXATION AT VIEW ANGLE α=60° |
| B~C | | 120~240 ω=ZP | 120°~240° | α=60~120 | | FIXATION AT DISPLACEMENT d=1 |
| C~D | | 240~268.5 ω≠ZP | 240°~300° | d=1~dmax1 | α=ω/2 | FIXATION AT VIEW ANGLE α=120° |
| | | | | | d=1+(dmax2−1)*(ZP−240)/120 | A MAXIMUM DISPLAY DISTANCE dmax1 IS BASED ON A SIZE OF AN OUTPUT AREA |
| D~E | viewWH/imgWH*360/ω *tan(asin(1/d)/tan(α/2)) | 268.5~300 ω≠ZP | 300°~278° | d=dmax1~dmax2 | d=1+(dmax2−1)*(ZP−240)/120 | FIXATION AT VIEW ANGLE α=120° A LIMIT DISPLAY DISTANCE dmax2 IS BASED ON A SIZE OF AN OUTPUT AREA |

FIG.16A
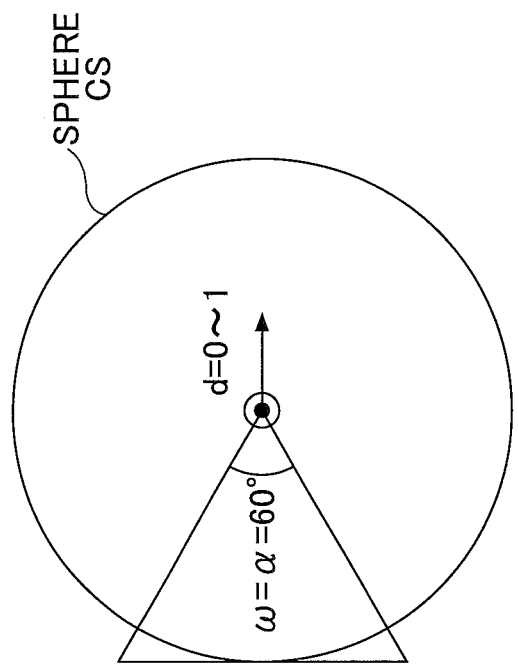
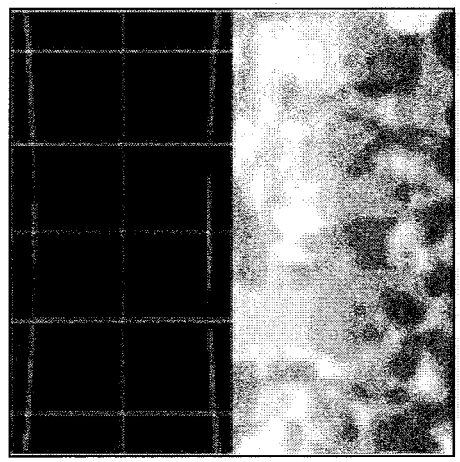

FIG.16B
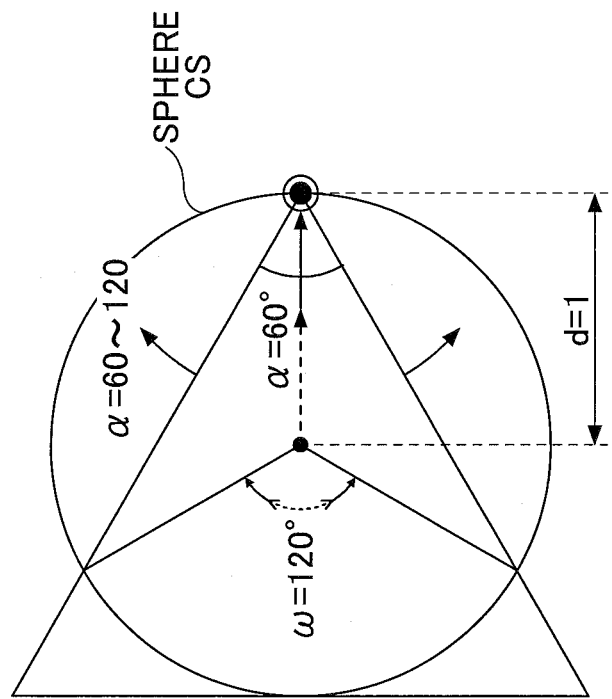
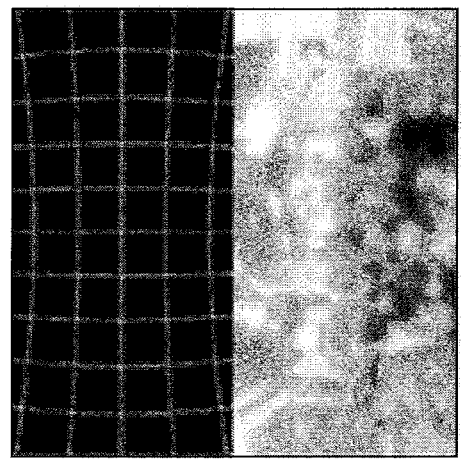

FIG.16C
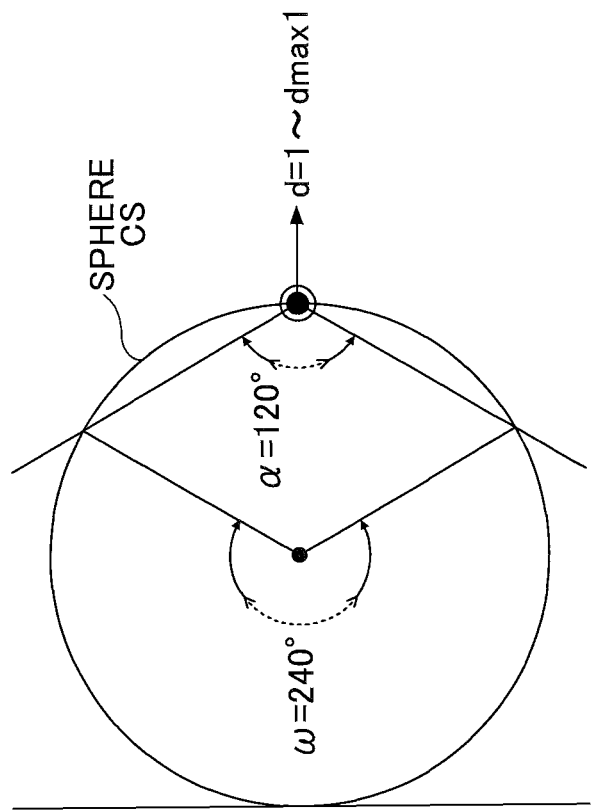
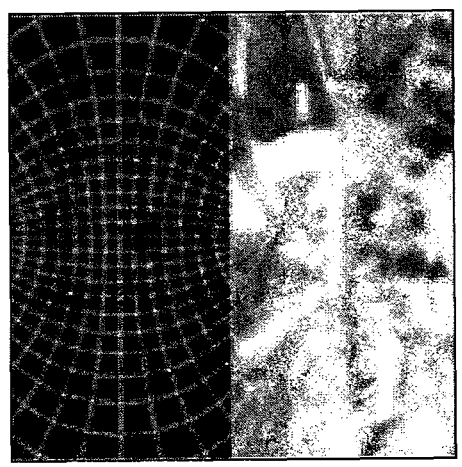

FIG.16D
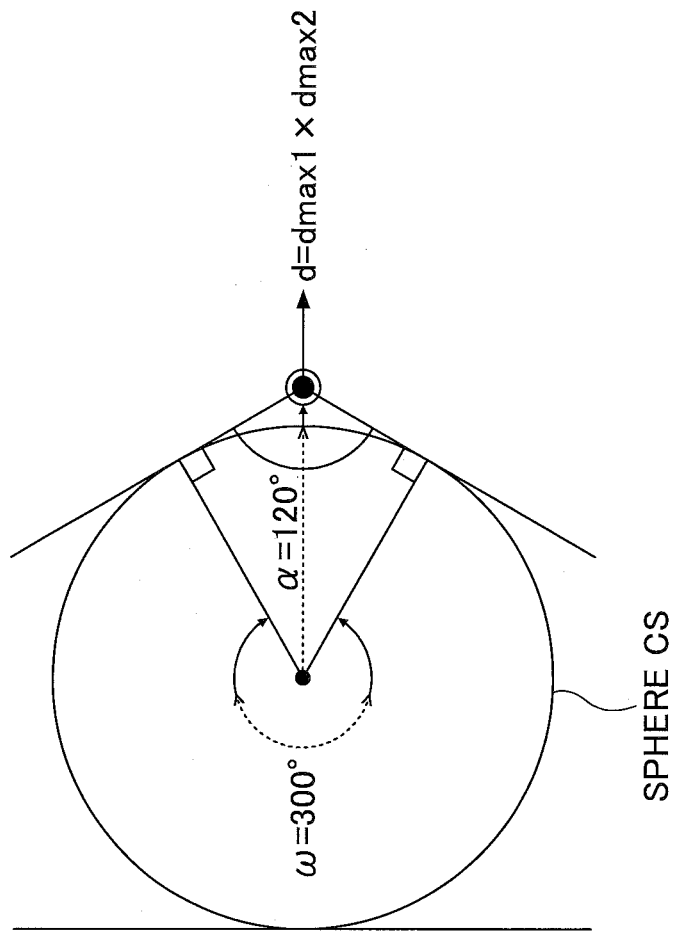
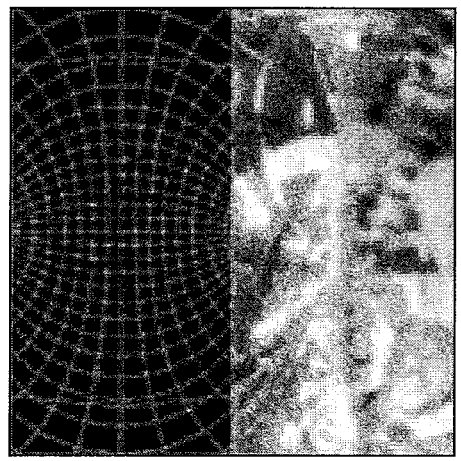

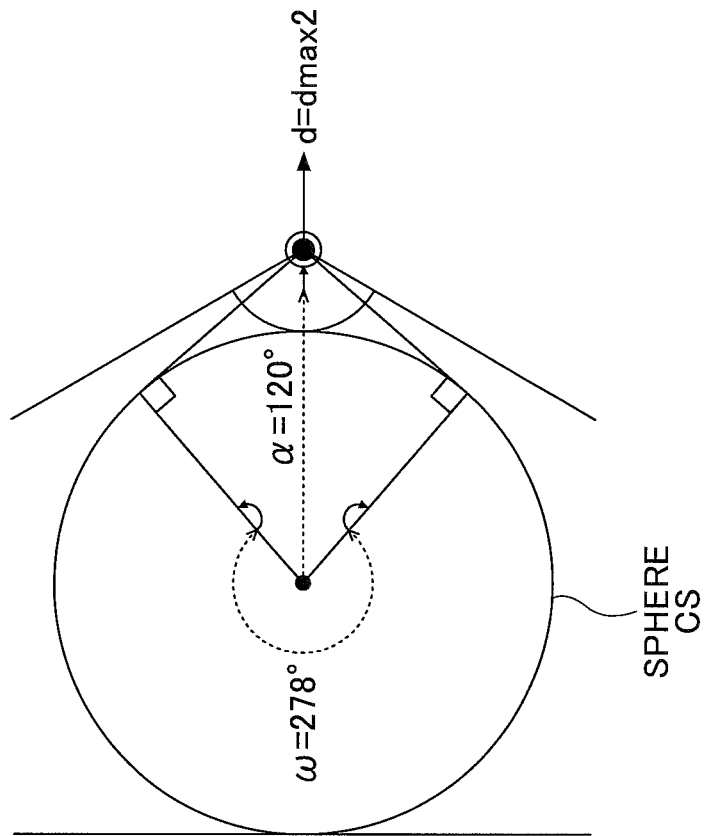
FIG.16E
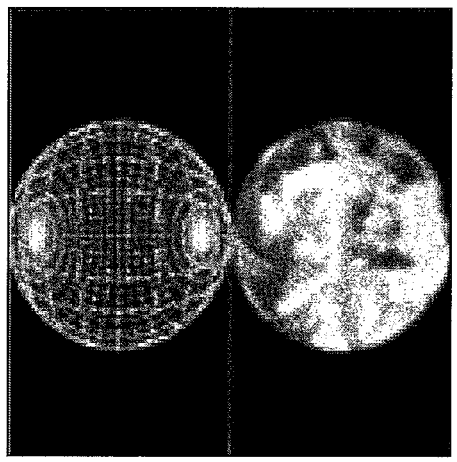

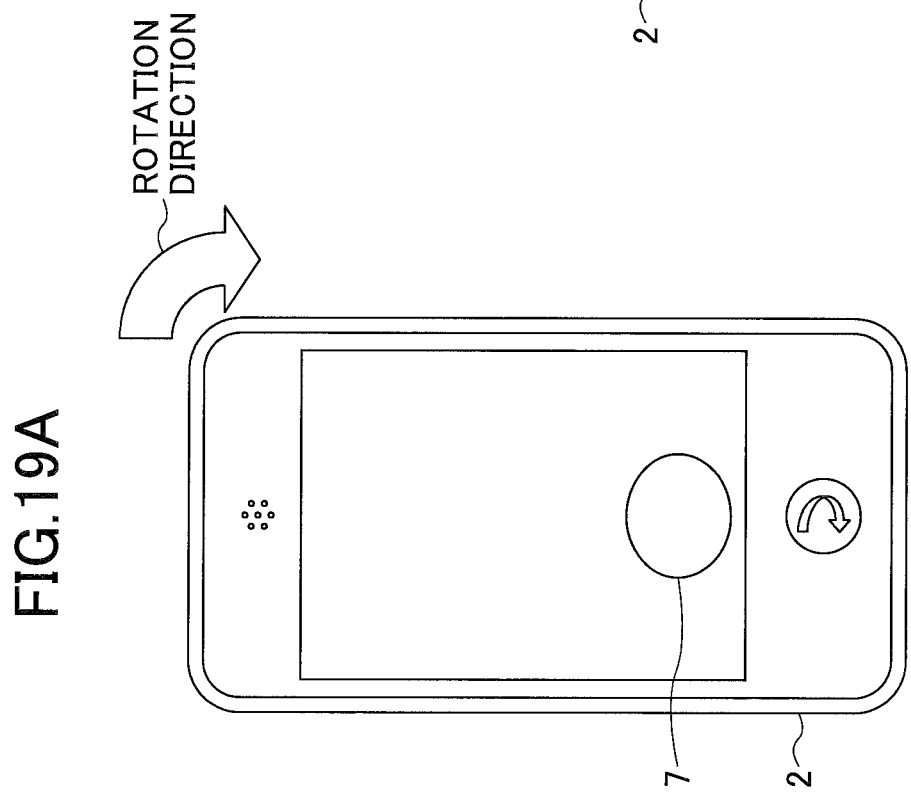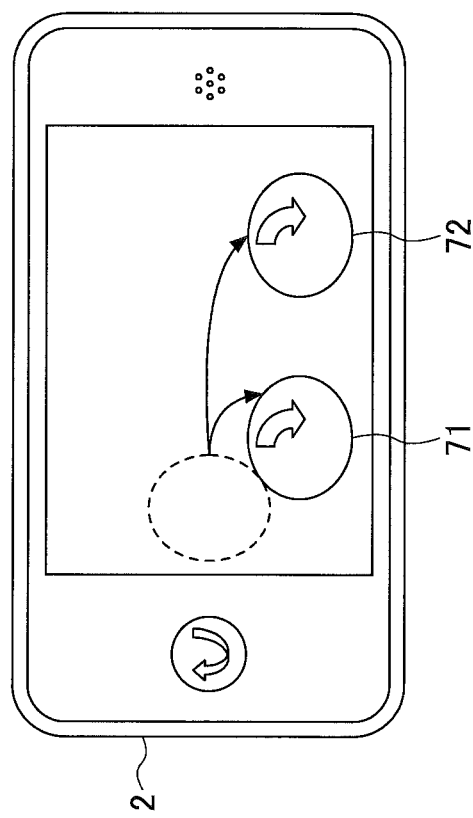

INFORMATION PROCESSING METHOD, INFORMATION PROCESSING DEVICE, AND PROGRAM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2015/057609 filed on Mar. 10, 2015, which is based upon and claims the benefit of priority of the prior Japanese Patent Application No. 2014-054782 filed on Mar. 18, 2014, the entire contents of which are incorporated herein by reference.

BACKGROUND OF THE INVENTION

1. Field of the Invention

The present invention relates to at least one of an information processing method, an information processing device, and a program.

2. Description of the Related Art

A method for displaying a panoramic image has been known conventionally.

A user interface (that will be referred to as a "UI" below) has been known for accepting an instruction from a user with respect to display of a panoramic image in a panoramic image display (see, for example, Japanese Patent Application Publication No. 2011-076249).

However, a conventional UI assigns a function for scrolling an image to so-called "dragging" at a time of image display on a smartphone or the like, and hence, it may be difficult for a user to execute an image operation, for example, editing of an image or the like.

SUMMARY OF THE INVENTION

According to one aspect of the present invention, there is provided an information processing method for causing a computer to process an image, wherein the image processing method causes the computer to execute an acquisition step of acquiring the image, a first production step of producing an editing image for editing at least a portion of the image and a first changing image for changing the editing image to be output, an editing step of editing the image on the produced editing image, a second production step of producing a second changing image based on an image edited at the editing step, and an output step of outputting an output image that has at least the editing image edited at the editing step and the second changing image produced at the second production step.

BRIEF DESCRIPTION OF THE DRAWINGS

FIG. 2A, FIG. 2B, and FIG. 2C are diagrams that illustrate one example of an image taking device according to one embodiment of the present invention.

FIG. 8A, FIG. 8B, FIG. 8C, and FIG. 8D are diagrams that illustrate one example of an all celestial sphere image according to one embodiment of the present invention.

FIG. 10A, FIG. 10B, FIG. 10C, and FIG. 10D are diagrams for illustrating one example of an initial image according to one embodiment of the present invention.

FIG. 12A, FIG. 12B, and FIG. 12C are diagrams for illustrating one example of editing of an area to be output according to one embodiment of the present invention.

FIG. 15 is a table for illustrating one example of another zoom process according to one embodiment of the present invention.

FIG. 16A, FIG. 16B, FIG. 16C, FIG. 16D, and FIG. 16E are diagrams for illustrating one example of a "range" of another zoom process according to one embodiment of the present invention.

FIG. 19A and FIG. 19B are diagrams for illustrating one example of changing of an output such as a position or direction of a changing image according to one embodiment of the present invention.

DETAILED DESCRIPTION OF THE PREFERRED EMBODIMENTS

An embodiment of the present invention will be described below.

First Embodiment

<An Entire Configuration of a System>

Figure 1:
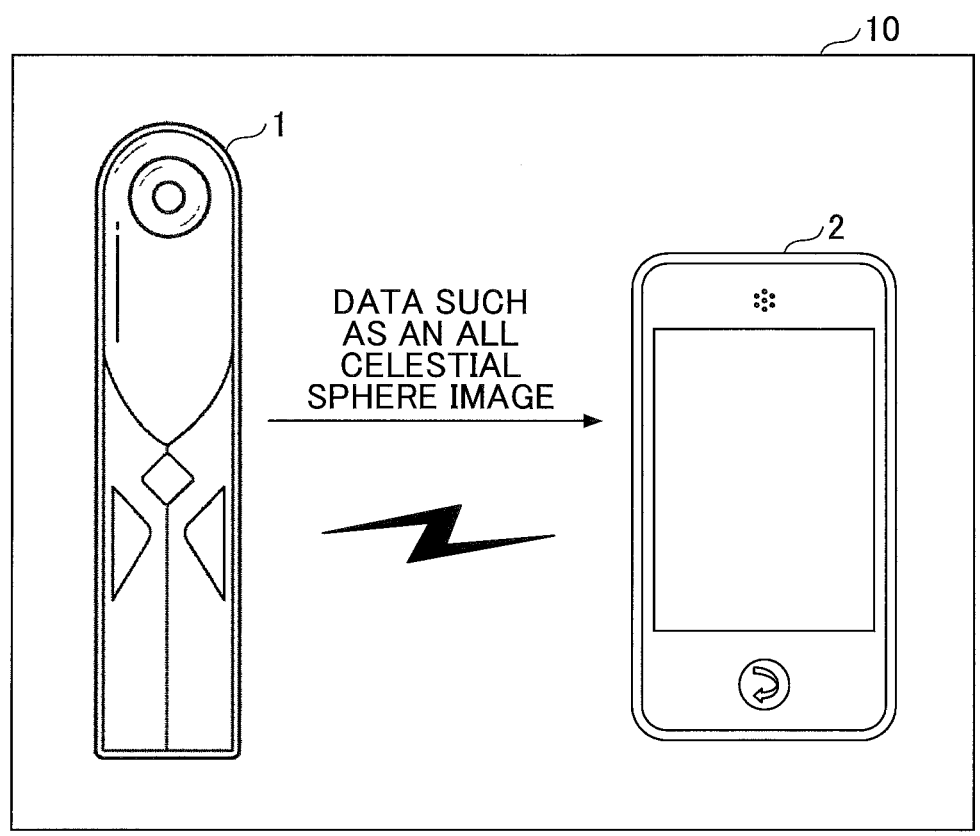
FIG. 1 is a diagram that illustrates one example of an entire configuration of an image taking system according to one embodiment of the present invention.

FIG. 1 is a diagram that illustrates one example of an entire configuration of an image taking system according to one embodiment of the present invention.

An image taking system 10 has an image taking device 1 and a smartphone 2.

The image taking device 1 has a plurality of optical systems, and produces, and outputs to the smartphone 2, for example, a taken image of a wide range such as all directions around the image taking device 1 (that will be referred to as an "all celestial sphere image" below). Details of the image taking device 1 and an all celestial sphere image will be described below. An image that is processed by the image taking system 10 is, for example, an all celestial sphere image. A panoramic image is, for example, an all celestial sphere image. An example of an all celestial sphere image will be described below.

An information processing device is, for example, the smartphone 2. The smartphone 2 will be described as an example below. The smartphone 2 is a device for causing a user to operate an all celestial sphere image acquired from the image taking device 1. The smartphone 2 is a device for causing a user to output an acquired all celestial sphere image. A detail of the smartphone 2 will be described below.

The image taking device 1 and the smartphone 2 are subjected to wired or wireless connection. For example, the smartphone 2 downloads from the image taking device 1, and inputs to the smartphone 2, data such an all celestial sphere image output from the image taking device 1. Here, connection may be executed through a network.

Here, an entire configuration is not limited to a configuration illustrated in FIG. 1. For example, the image taking device 1 and the smartphone 2 may be an integrated device. Furthermore, another computer other than the image taking device 1 and the smartphone 2 may be connected to be composed of three or more devices.

<An Image Taking Device>

FIG. 2A, FIG. 2B, and FIG. 2C are diagrams that illustrate one example of an image taking device according to one embodiment of the present invention.

FIG. 2A, FIG. 2B, and FIG. 2C are diagrams that illustrate one example of an appearance of the image taking device 1. FIG. 2A is one example of an elevation view of the image taking device 1. FIG. 2B is one example of a left side view of the image taking device 1. FIG. 2C is one example of a plan view of the image taking device 1.

The image taking device 1 has a front side image taking element 1H1, a back side image taking element 1H2, and a switch 1H3. A hardware that is provided in an interior of the image taking device 1 will be described below.

The image taking device 1 produces an all celestial sphere image by using images taken by the front side image taking element 1H1 and the back side image taking element 1H2.

The switch 1H3 is a so-called "shutter button" and is an input device for causing a user to execute an instruction of image taking for the image taking device 1.

The image taking device 1 is held by hand of a user, for example, as illustrated in FIG. 2A, and the switch 1H3 is pushed to execute image taking.

Figure 3:
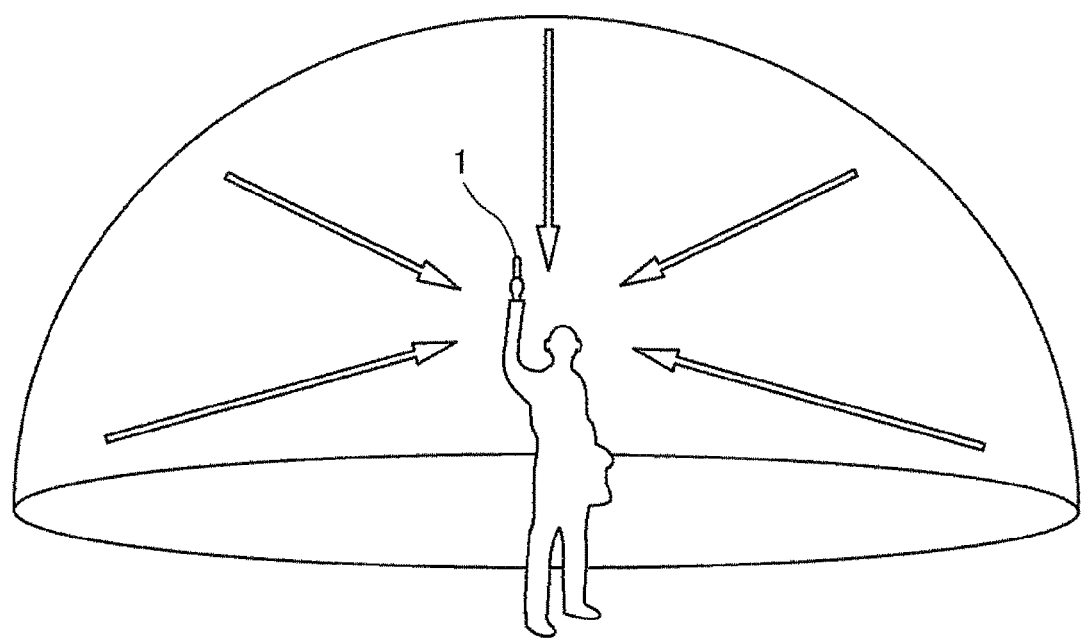
FIG. 3 is a diagram that illustrates one example of image taking by an image taking device according to one embodiment of the present invention.

FIG. 3 is a diagram that illustrates one example of image taking by an image taking device according to one embodiment of the present invention.

As illustrated in FIG. 3, a user holds the image taking device 1 by hand and pushes the switch 1H3 in FIG. 2A, FIG. 2B, and FIG. 2C to execute image taking. As illustrated in FIG. 3, it is possible for the image taking device 1 to take an image in all directions around the image taking device 1 by the front side image taking element 1H1 in FIG. 2A, FIG. 2B, and FIG. 2C and the back side image taking element 1H2 in FIG. 2A, FIG. 2B, and FIG. 2C.

Figure 4C:
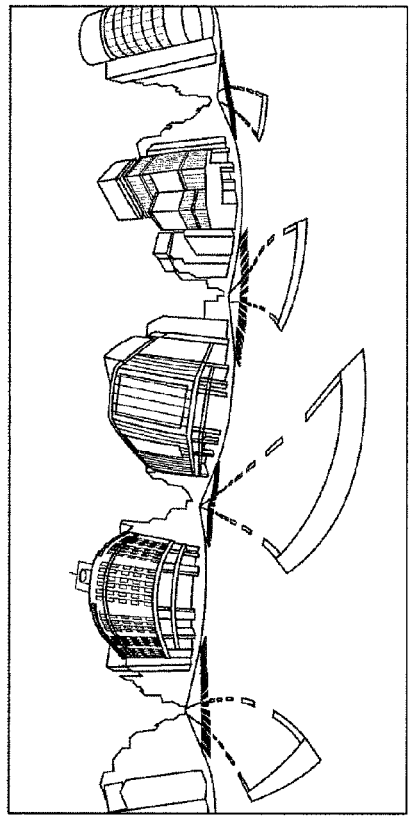
FIG. 4A, FIG. 4B, and FIG. 4C are diagrams that illustrate one example of an image taken by an image taking device according to one embodiment of the present invention.
Figure 4A:
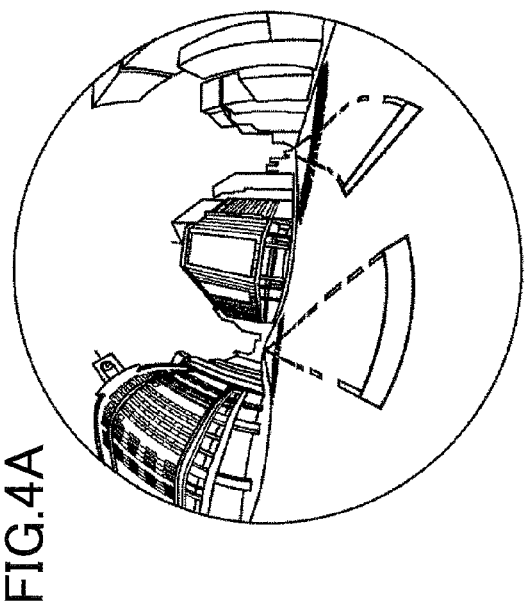
Figure 4B:
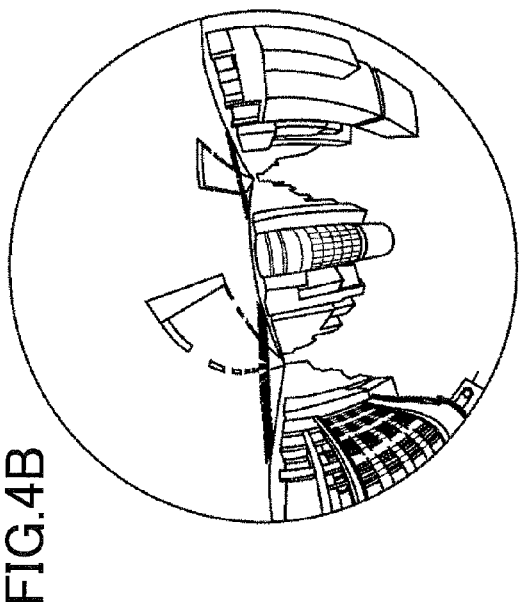

FIG. 4A, FIG. 4B, and FIG. 4C are diagrams that illustrate one example of an image taken by an image taking device according to one embodiment of the present invention.

FIG. 4A is one example of an image taken by the front side image taking element 1H1 in FIG. 2A, FIG. 2B, and FIG. 2C. FIG. 4B is one example of an image taken by the back side image taking element 1H2 in FIG. 2A, FIG. 2B, and FIG. 2C. FIG. 4C is one example of an image that is produced based on an image taken by the front side image taking element 1H1 in FIG. 2A, FIG. 2B, and FIG. 2C and an image taken by the back side image taking element 1H2 in FIG. 2A, FIG. 2B, and FIG. 2C.

An image taken by the front side image taking element 1H1 in FIG. 2A, FIG. 2B, and FIG. 2C is an image with an image taking range that is a wide range in a front direction of the image taking device 1, for example, a range of 180° as an angle of view, as illustrated in FIG. 4A. An image taken by the front side image taking element 1H1 in FIG. 2A, FIG. 2B, and FIG. 2C has a distortion aberration as illustrated in FIG. 4A, in a case where the front side image taking element 1H1 in FIG. 2A, FIG. 2B, and FIG. 2C uses an optical system for taking an image with a wide range, for example, a so-called "fisheye lens". An image in FIG. 4A taken by the front side image taking element 1H1 in FIG. 2A, FIG. 2B, and FIG. 2C is a so-called "hemispherical image" that has a wide range in one side of the image taking device 1 and a distortion aberration (that will be referred to as a "hemispherical image" below).

Here, it is desirable for an angle of view to be within a range greater than or equal to 180° and less than or equal to 200°. In particular, as a hemispherical image in FIG. 4A and a hemispherical image in FIG. 4B that will be described below are synthesized in a case where an angle of view is greater than 180°, there is an overlapping image area, and hence, synthesis is facilitated.

An image taken by the back side image taking element 1H2 in FIG. 2A, FIG. 2B, and FIG. 2C is an image with an image taking range that is a wide range in a back direction of the image taking device 1, for example, a range of 180° as an angle of view, as illustrated in FIG. 4B.

An image in FIG. 4B taken by the back side image taking element 1H2 in FIG. 2A, FIG. 2B, and FIG. 2C is a hemispherical image similar to that of FIG. 4A.

The image taking device 1 executes processes such as a distortion correction process and a synthesis process, and thereby produces an image illustrated in FIG. 4C from a front side hemispherical image in FIG. 4A and a back side hemispherical image in FIG. 4B. FIG. 4C is an image produced by, for example, Mercator's projection, equidistant cylindrical projection, or the like, namely, an all celestial sphere image.

Here, an all celestial sphere image is not limited to an image produced by the image taking device 1. An all celestial sphere image may be, for example, an image taken by another camera or the like, or an image produced based on an image taken by another camera. It is desirable for an all celestial sphere image to be an image with a view angle in a wide range taken by a so-called "all direction camera", a so-called "wide angle lens camera", or the like.

Furthermore, an all celestial sphere image will be described as an example, and an image is not limited to such an all celestial sphere image. An image may be, for example, an image or the like taken by a compact camera, a single lens reflex camera, a smartphone, or the like. An image may be a panoramic image that extends horizontally or vertically, or the like.

<A Hardware Configuration of an Image Taking Device>

Figure 5:
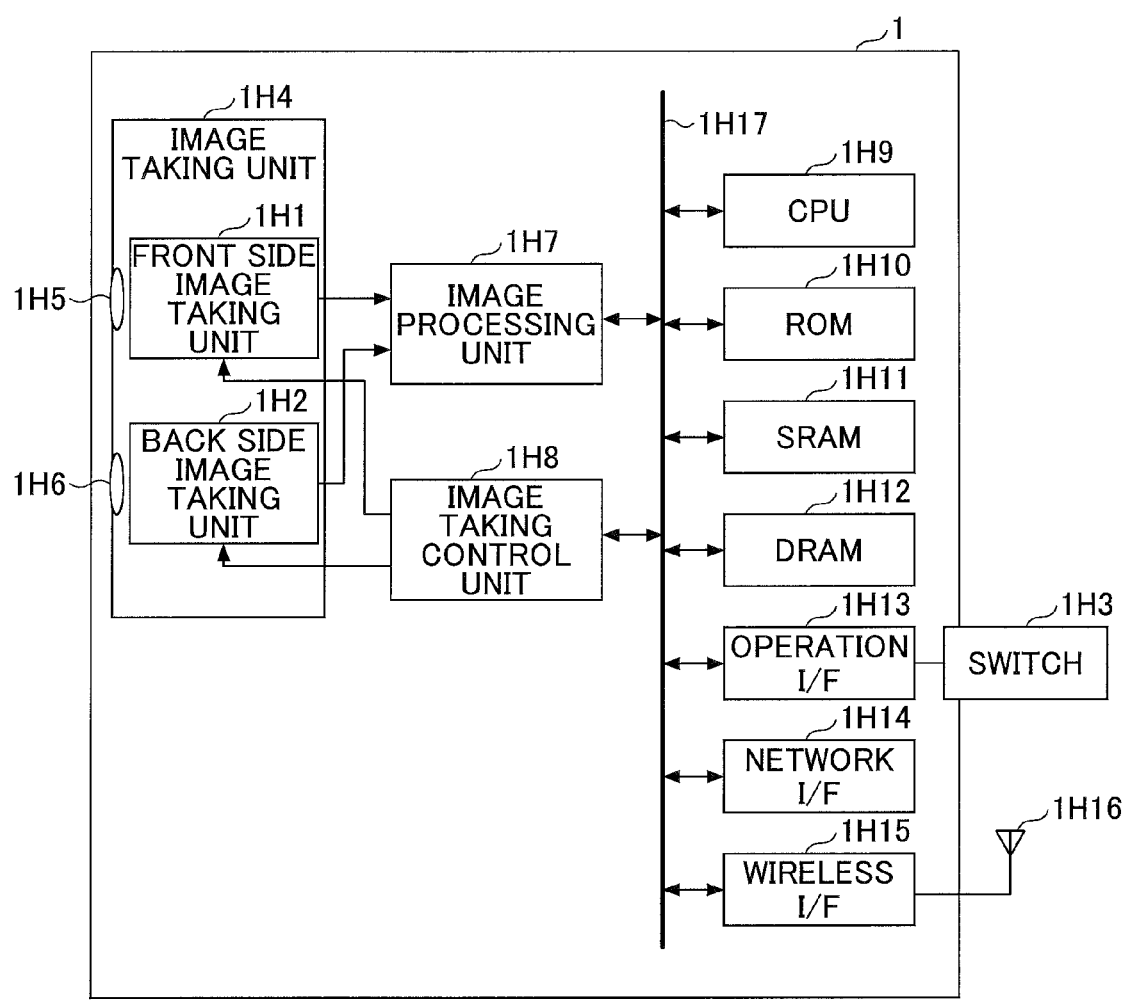
FIG. 5 is a block diagram that illustrates one example of a hardware configuration of an image taking device according to one embodiment of the present invention.

FIG. 5 is a block diagram that illustrates one example of a hardware configuration of an image taking device according to one embodiment of the present invention.

The image taking device 1 has an image taking unit 1H4, an image processing unit 1H7, an image control unit 1H8, a Central Processing Unit (CPU) 1H9, and a Read-Only Memory (ROM) 1H10. Furthermore, the image taking device 1 has a Static Random Access Memory (SRAM) 1H11, a Dynamic Random Access Memory (DRAM) 1H12, and an operation interface (I/F) 1H13. Moreover, the image taking device 1 has a network I/F 1H14, a wireless I/F 1H15, and an antenna 1H16. Each component of the image taking device 1 is connected through a bus 1H17 and executes input or output of data or a signal.

The image taking unit 1H4 has the front side image taking element 1H1 and the back side image taking element 1H2. A lens 1H5 that corresponds to the front side image taking element 1H1 and a lens 1H6 that corresponds to the back side image taking element 1H2 are placed. The front side image taking element 1H1 and the back side image taking element 1H2 are so-called "camera units". The front side image taking element 1H1 and the back side image taking element 1H2 have optical sensors such as a Complementary Metal Oxide semiconductor (CMOS) or a Charge Coupled Device (CCD). The front side image taking element 1H1 executes a process for converting light incident on the lens 1H5 to produce image data. The back side image taking element 1H2 executes a process for converting light incident on the lens 1H6 to produce image data. The image taking unit 1H4 outputs image data produced by the front side image taking element 1H1 and the back side image taking element 1H2 to the image processing unit 1H7. For example, image data are the front side hemispherical image in FIG. 4A and the back side hemispherical image in FIG. 4B or the like.

Here, the front side image taking element 1H1 and the back side image taking element 1H2 may have an optical element other than a lens, such as a stop or a low-pass filter, in order to execute image taking with a high image quality. Furthermore, the front side image taking element 1H1 and the back side image taking element 1H2 may execute a process such as a so-called "defective pixel correction" or a so-called "hand movement correction" in order to execute image taking with a high image quality.

The image processing unit 1H7 executes a process for producing an all celestial sphere image in FIG. 4C from image data that are input from the image taking unit 1H4. A detail of a process for producing an all celestial sphere image will be described below. Here, a process that is executed by the image processing unit 1H7 may be such that a part or an entirety of a process is executed in parallel and redundantly by another computer.

The image taking control unit 1H8 is a control device that controls each component of the image taking device 1.

The CPU 1H9 executes an operation or a control for each process that is executed by the image taking device 1. For example, the CPU 1H9 executes each kind of program. Here, the CPU 1H9 may be composed of a plurality of CPUs or devices or a plurality of cores in order to attain speeding-up due to parallel processing. Furthermore, a process of the CPU 1H9 may be such that another hardware resource is provided inside or outside the image taking device 1 and caused to execute a part or an entirety of a process for the image taking device 1.

The ROM 1H10, the SRAM 1H11, and the DRAM 1H12 are examples of a storage device. The ROM 1H10 stores, for example, a program, data, or a parameter that is executed by the CPU 1H9. The SRAM 1H11 and the DRAM 1H12 store, for example, a program, data to be used in a program, data to be produced by a program, a parameter, or the like, in a case where the CPU 1H9 executes a program. Here, the image taking device 1 may have an auxiliary storage device such as a hard disk.

The operation I/F 1H13 is an interface that executes a process for inputting an operation of a user to the image taking device 1, such as the switch 1H3. The operation I/F 1H13 is an operation device such as a switch, a connector or cable for connecting an operation device, a circuit for processing a signal input from an operation device, a driver, a control device, or the like. Here, the operation I/F 1H13 may have an output device such as a display. Furthermore, the operation I/F 1H13 may be a so-called "touch panel" wherein an input device and an output device are integrated, or the like. Moreover, the operation I/F 1H13 may have an interface such as a Universal Serial Bus (USB), connect a storage medium such as Flash Memory ("Flash Memory" is a registered trademark), and input from and output to the image taking device 1, data.

Here, the switch 1H3 may have an electric power source switch for executing an operation other than a shutter operation, a parameter input switch, or the like.

The network I/F 1H14, the wireless I/F 1H15, and the antenna 1H16 are devices for connecting the image taking device 1 with another computer through a wireless or wired network and a peripheral circuit or the like. For example, the image taking device 1 is connected to a network through the network I/F 1H14 and transmits data to the smartphone 2. Here, the network I/F 1H14, the wireless I/F 1H15, and the antenna 1H16 may be configured to be connected by using a connector such as a USB, a cable, or the like.

The bus 1H17 is used for an input or an output of data or the like between respective components of the image taking device 1. The bus 1H17 is a so-called "internal bus". The bus 1H17 is, for example, a Peripheral Component Interconnect Bus Express (PCI Express).

Here, the image taking device 1 is not limited to a case of two image taking elements. For example, it may have three or more image taking elements. Moreover, the image taking device 1 may change an image taking angle of one image taking element to take a plurality of partial images. Furthermore, the image taking device 1 is not limited to an optical system that uses a fisheye lens. For example, a wide angle lens may be used.

Here, a process that is executed by the image taking device 1 is not limited to that is executed by the image taking device 1. A part or an entirety of a process that is executed by the image taking device 1 may be executed by the smartphone 2 or another computer connected through a network while the image taking device 1 may transmit data or a parameter.

<A Hardware Configuration of an Information Processing Device>

Figure 6:
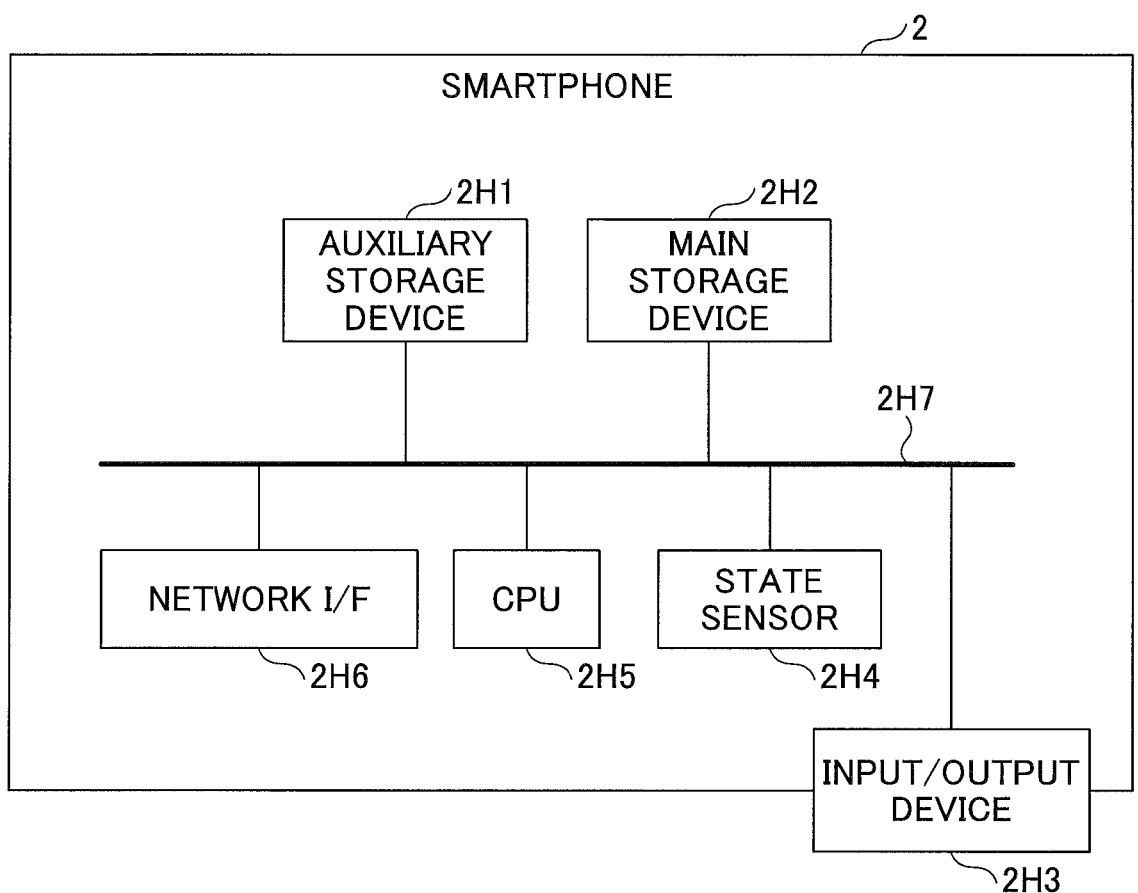
FIG. 6 is a block diagram that illustrates one example of a hardware configuration of a smartphone according to one embodiment of the present invention.

FIG. 6 is a block diagram that illustrates one example of a hardware configuration of an information processing device that includes a smartphone according to one embodiment of the present invention.

An information processing device is a computer. An information processing device may be, for example, a notebook Personal Computer (PC), a Personal Digital Assistance (PDA), a tablet, a mobile phone, or the like, other than a smartphone.

The smartphone 2 that is one example of an information processing device has an auxiliary storage device 2H1, a main storage device 2H2, an input/output device 2H3, a state sensor 2H4, a CPU 2H5, and a network I/F 2H6. Each component of the smartphone 2 is connected to a bus 2H7 and executes an input or an output of data or a signal.

The auxiliary storage device 2H1 stores information such as each kind of data that includes an intermediate result of a process executed by the CPU 2H5 due to a control of the CPU 2H5, a control device, or the like, a parameter, or a program. The auxiliary storage device 2H1 is, for example, a hard disk, a flash Solid State Drive (SSD), or the like. Here, information stored in the auxiliary storage device 2H1 is such that a part or an entirety of such information may be stored in a file server connected to the network I/F 2H6 or the like, instead of the auxiliary storage device 2H1.

The main storage device 2H2 is a main storage device such as a storage area to be used by a program that is executed by the CPU 2H5, that is, a so-called "Memory". The main storage device 2H2 stores information such as data, a program, or a parameter. The main storage device 2H2 is, for example, a Static Random Access Memory (SRAM), a DRAM, or the like. The main storage device 2H2 may have a control device for executing storage in or acquisition from a memory.

The input/output device 2H3 is a device that has functions of an output device for executing display and an input device for inputting an operation of a user.

The input/output device 2H3 is a so-called "touch panel", a "peripheral circuit", a "driver", or the like.

The input/output device 2H3 executes a process for displaying, to a user, an image input in, for example, a predetermined Graphical User Interface (GUI) or the smartphone 2.

The input/output device 2H3 executes a process for inputting an operation of a user, for example, in a case where a GUI with a display or an image is operated by such a user.

The state sensor 2H4 is a sensor for detecting a state of the smartphone 2. The state sensor 2H4 is a gyro sensor, an angle sensor, or the like. The state sensor 2H4 determines, for example, whether or not one side that is possessed by the smartphone 2 is provided at a predetermined or greater angle with respect to a horizon. That is, the state sensor 2H4 executes a detection as to whether the smartphone 2 is provided at a state of a longitudinally directional attitude or a state of a laterally directional attitude.

The CPU 2H5 executes a calculation in each process that is executed by the smartphone 2 and a control of a device that is provided in the smartphone 2. For example, the CPU 2H5 executes each kind of program. Here, the CPU 2H5 may be composed of a plurality of CPUs or devices, or a plurality of cores in order to execute a process in parallel, redundantly, or dispersedly. Furthermore, a process for the CPU 2H5 is such that another hardware resource may be provided inside or outside the smartphone 2 to execute a part or an entirety of a process for the smartphone 2. For example, the smartphone 2 may have a Graphics Processing Unit (GPU) for executing image processing, or the like.

The network I/F 2H6 is a device such as an antenna, a peripheral circuit, a driver, or the like, for inputting or outputting data, or the like, that is connected to another computer through a wireless or wired network. For example, the smartphone 2 executes a process for inputting image data from the image taking device 1 due to the CPU 2H5 and the network I/F 2H6. The smartphone 2 executes a process for outputting a predetermined parameter or the like to the image taking device 1 due to the CPU 2H5 and the network I/F 2H6.

<An Entire Process for an Image Taking System>

Figure 7:
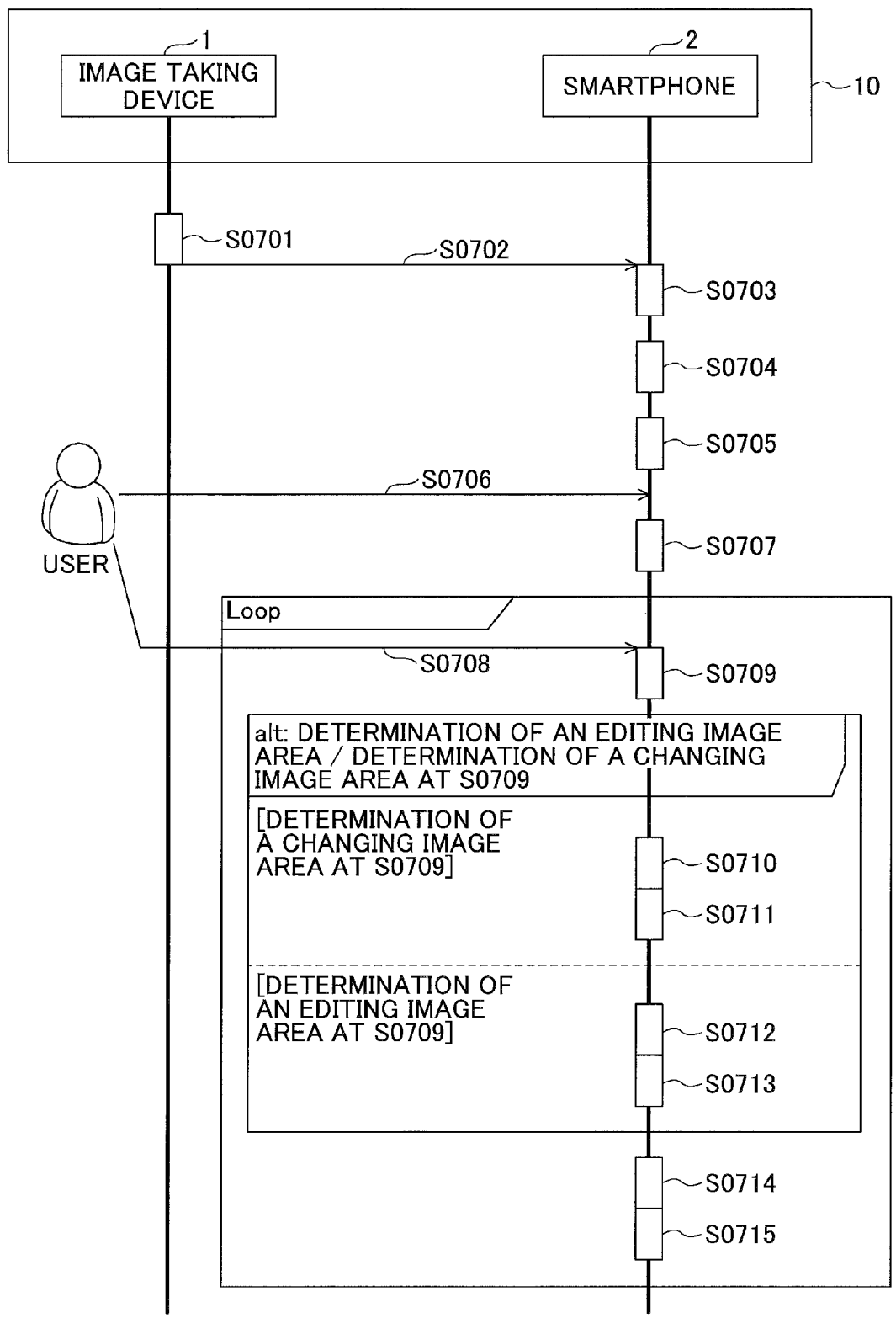
FIG. 7 is a sequence diagram that illustrates one example of an entire process of an image taking system according to one embodiment of the present invention.

FIG. 7 is a sequence diagram that illustrates one example of an entire process for an image taking system according to one embodiment of the present invention.

At step S0701, the image taking device 1 executes a process for producing an all celestial sphere image.

FIG. 8A, FIG. 8B, FIG. 8C, and FIG. 8D are diagrams that illustrate one example of an all celestial sphere image according to one embodiment of the present invention.

FIG. 8A, FIG. 8B, FIG. 8C, and FIG. 8D are diagrams that illustrate one example of a process for producing an all celestial sphere image at step S0701.

Figure 8A:
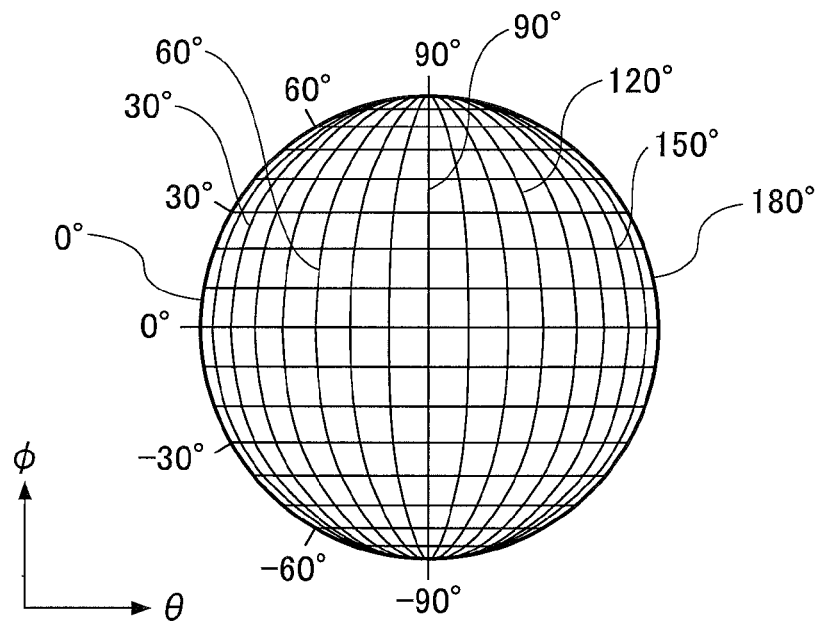

FIG. 8A is a diagram illustrated in such a manner that positions in a hemispherical image in FIG. 4A where incidence angles are equal in a horizontal direction or a vertical direction with respect to an optical axis are connected by a line. An incidence angle $\theta$ in a horizontal direction with respect to an optical axis and an incidence angle $\phi$ in a vertical direction with respect to such an optical axis will be denoted below.

Figure 8B:
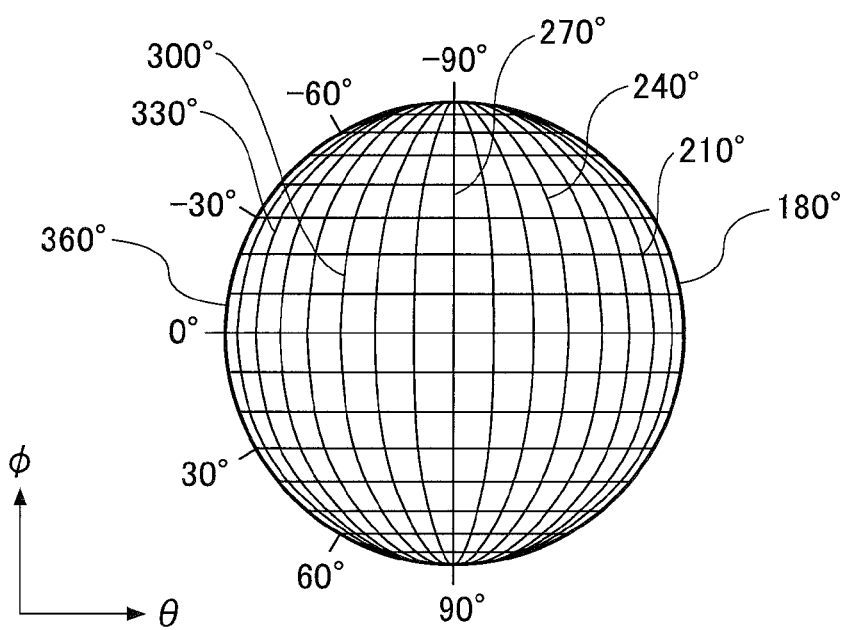

Similarly to FIG. 8A, FIG. 8B is a diagram illustrated in such a manner that positions in a hemispherical image in FIG. 4B where incidence angles are equal in a horizontal direction or a vertical direction with respect to an optical axis are connected by a line.

FIG. 8C is a diagram that illustrates one example of an image processed in accordance with Mercator projection. FIG. 8C is an example of a case where an image in a state illustrated in FIG. 8A or FIG. 8B is, for example, caused to correspond to a preliminarily produced Look Up Table (LUT) or the like and processed in accordance with equidistant cylindrical projection.

FIG. 8D is one example of a synthesis process for synthesizing images provided by applying a process illustrated in FIG. 8C to FIG. 8A and FIG. 8B.

As illustrated in FIG. 8D, a synthesis process is to produce an image by using a plurality of images, for example, in a state illustrated in FIG. 8C. Here, a synthesis process is not limited to a process for simply arranging pre-processed images successively. For example, in a case where a center of an all celestial sphere image in a horizontal direction is not provided at $\theta=180°$, a synthesis process may be a process for executing a synthesis process in such a manner that a pre-processed image in FIG. 4A is arranged at a center of an all celestial sphere image and a pre-processed image in FIG. 4B is divided and arranged at left and right sides thereof, so as to produce an all celestial sphere image illustrated in FIG. 4C.

Here, a process for producing an all celestial sphere image is not limited to a process in accordance with equidistant cylindrical projection. For example, a so-called "upside-down" case is provided in such a manner that, like FIG. 8B, an alignment of pixels in a direction of $\phi$ is upside-down with respect to an alignment in FIG. 8A and an alignment of pixels in a direction of $\theta$ is left-right reversal with respect to an alignment in FIG. 8A. In an upside-down case, the image taking device 1 may execute a process for rolling or rotating a pre-processed image in a state of FIG. 8E by 180° so as to align with an alignment of pixels in a direction of $\phi$ and a direction of $\theta$ in FIG. 8A.

Furthermore, a process for producing an all celestial sphere image may execute a correction process for correcting distortion aberration that is provided in an image in a state of FIG. 8A or FIG. 8B. Moreover, a process for producing an all celestial sphere image may execute a process for improving an image quality, for example, shading correction, gamma correction, white balance, hand movement correction, an optical black correction process, a defective pixel correction process, an edge enhancement process, a linear correction process, or the like.

Here, for example, in a case where an image taking range of a hemispherical image overlaps with an image taking range of another hemispherical image, a synthesis process may execute correction by utilizing an overlapping range to execute such a synthesis process at high precision.

Due to a process for producing an all celestial sphere image, the image taking device 1 produces an all celestial sphere image from a hemispherical image that is taken by the image taking device 1.

At step S0702, the smartphone 2 executes a process for acquiring an all celestial sphere image produced at step S0701. A case where the smartphone 2 acquires an all celestial sphere image in FIG. 8D will be described as an example below.

At step S0703, the smartphone 2 produces an all celestial sphere panoramic image from an all celestial sphere image acquired at step S0702.

Figure 9:
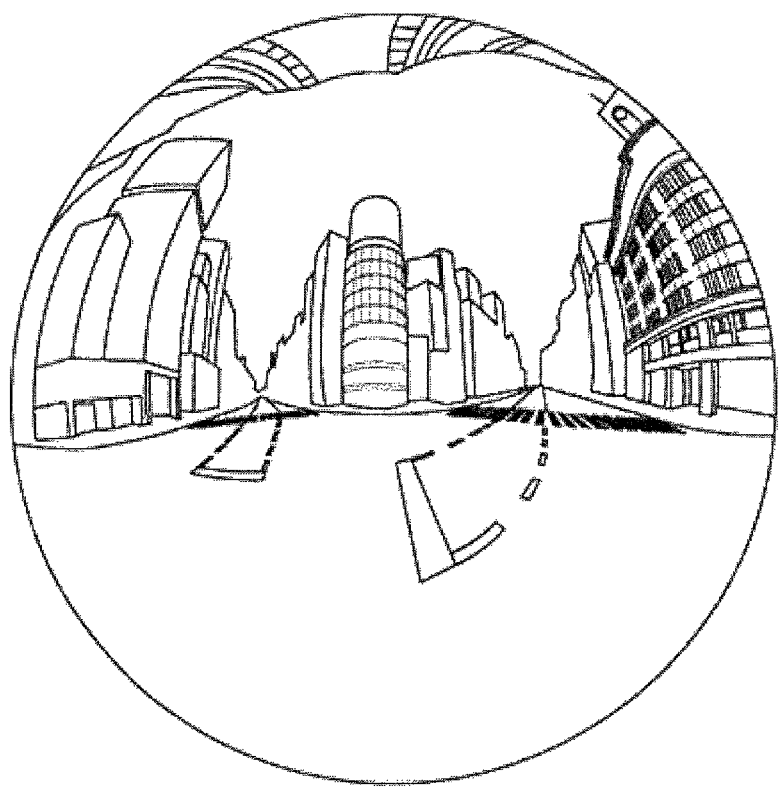
FIG. 9 is a diagram that illustrates one example of an all celestial sphere panoramic image according to one embodiment of the present invention.

FIG. 9 is a diagram that illustrates one example of an all celestial sphere panoramic image according to one embodiment of the present invention.

At step S0703, the smartphone 2 executes a process for producing an all celestial sphere panoramic image in FIG. 9 from an all celestial sphere image in FIG. 8D. An all celestial sphere panoramic image is an image provided in such a manner that an all celestial sphere image is applied onto a spherical shape.

A process for producing an all celestial sphere panoramic image is realized by, for example, an Application Programming Interface (API) such as Open GL ("Open GL" is a registered trademark) for Embedded Systems (Open GL ES).

An all celestial sphere panoramic image is produced by dividing an image into triangles, joining vertices P of triangles (that will be referred to as "vertices P" below), and applying a polygon thereof.

At step S0704, the smartphone 2 executes a process for causing a user to input an operation for starting an output of an image. At step S0704, the smartphone 2, for example, reduces and outputs an all celestial sphere panoramic image produced at step S0703, that is, displays a so-called "thumbnail image". In a case where a plurality of all celestial sphere panoramic images are stored in the smartphone 2, the smartphone 2 outputs a list of thumbnail images, for example, to cause a user to select an image to be output. At step S0704, the smartphone 2 executes, for example, a process for inputting an operation for causing a user to select one image from a list of thumbnail images.

At step S0705, the smartphone 2 executes a process for producing an initial image based on an all celestial sphere panoramic image selected at step S0704.

FIG. 10A, FIG. 10B, FIG. 10C, and FIG. 10D are diagrams for illustrating one example of an initial image according to one embodiment of the present invention.

Figure 10A:
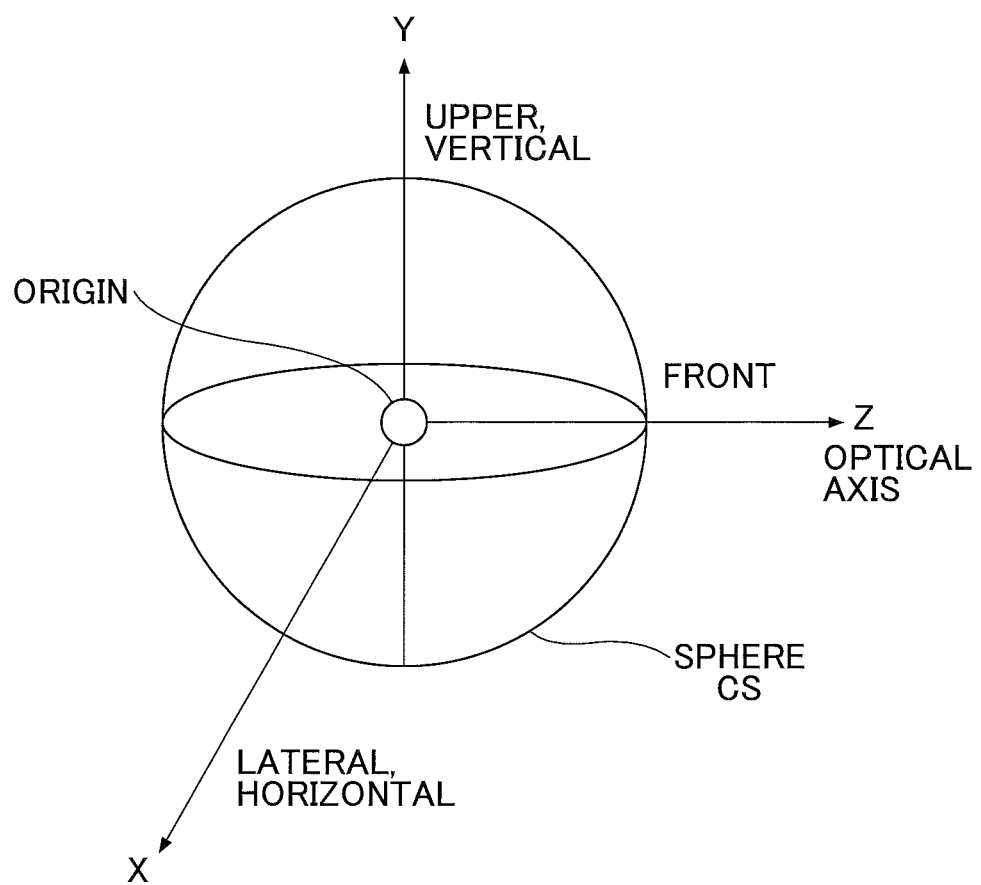

FIG. 10A is a diagram that illustrates a three-dimensional coordinate system for illustrating one example of an initial image according to one embodiment of the present invention.

As illustrated in FIG. 10A, a three-dimensional coordinate system with XYZ axes will be described below. The smartphone 2 places a virtual camera 3 at a position of an origin and produces each kind of image at a viewpoint of the virtual camera 3. In a case of a coordinate system in FIG. 10A, an all celestial sphere panoramic image is represented by, for example, a sphere CS. The virtual camera 3 corresponds to a viewpoint of a user that views an all celestial sphere panoramic image wherein such an all celestial sphere panoramic image is a sphere CS at a placed position thereof.

FIG. 10B is a diagram for illustrating one example of a predetermined area for a virtual camera according to one embodiment of the present invention.

Figure 10C:
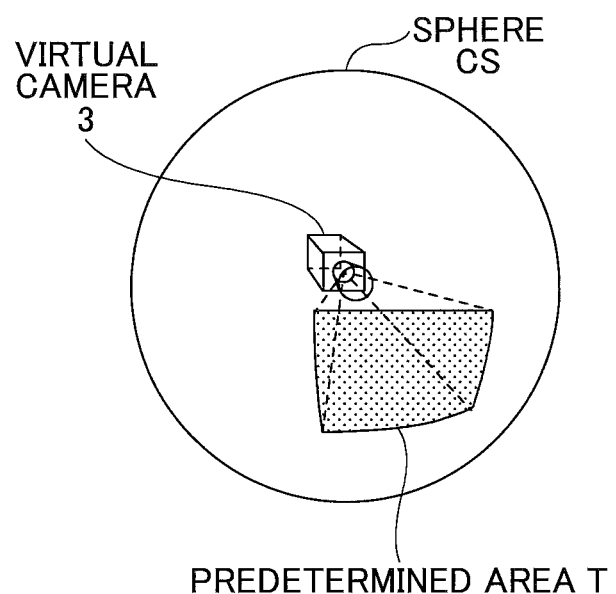

FIG. 10B is a case where FIG. 10A is represented by three-plane figures. FIG. 10B is a case where the virtual camera 3 is placed at an origin of FIG. 10A. FIG. 10C is a projection view of one example of a predetermined area for a virtual camera according to one embodiment of the present invention.

A predetermined area T is an area where a view angle of the virtual camera 3 is projected onto a sphere CS. The smartphone 2 produces an image based on a predetermined area T.

Figure 10D:
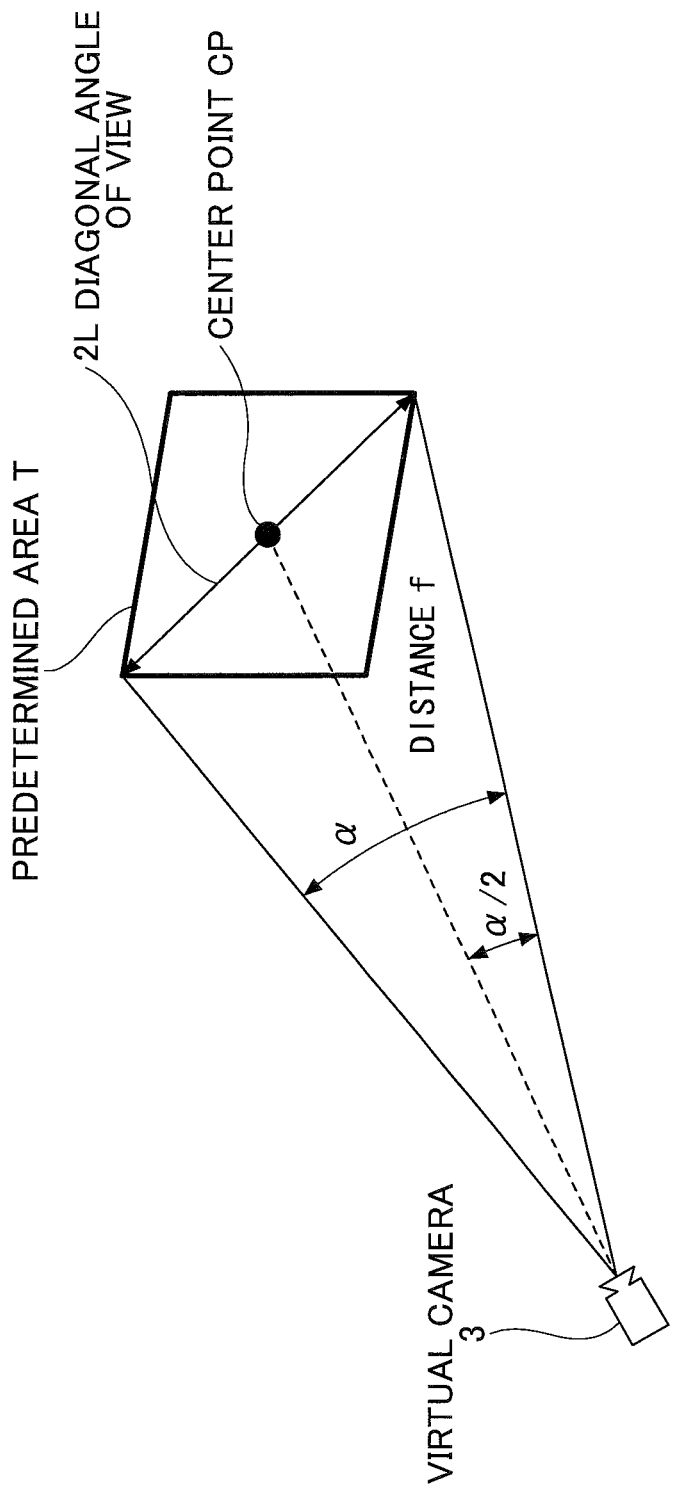

FIG. 10D is a diagram for illustrating one example of information for determining a predetermined area for a virtual camera according to one embodiment of the present invention.

A predetermined area T is determined by, for example, predetermined area information (x, y, α).

A view angle α is an angle that indicates an angle of the virtual camera 3 as illustrated in FIG. 10D. In a case of a diagonal angle of view 2L of a predetermined area T that is represented by a view angle α, coordinates of a center point CP of such a predetermined area T are represented by (x,y) in predetermined area information.

Here, a distance from the virtual camera 3 to a center point CP is represented by Formula (1) described below:

$$f=\tan(\alpha/2) \qquad \text{(Formula 1)}$$

An initial image is an image provided by determining a predetermined area T based on a preliminarily set initial setting and being produced based on such a determined predetermined area T. An initial setting is, for example, (x, y, α)=(0, 0, 34) or the like.

At step S0706, the smartphone 2 causes a user to execute an operation for switching to an image editing mode. Here, in a case where a user does not execute an operation for switching to an image editing mode, the smartphone 2 outputs, for example, an initial image.

At step S0707, the smartphone 2 executes a process for outputting an output image for editing an image.

Figure 11:
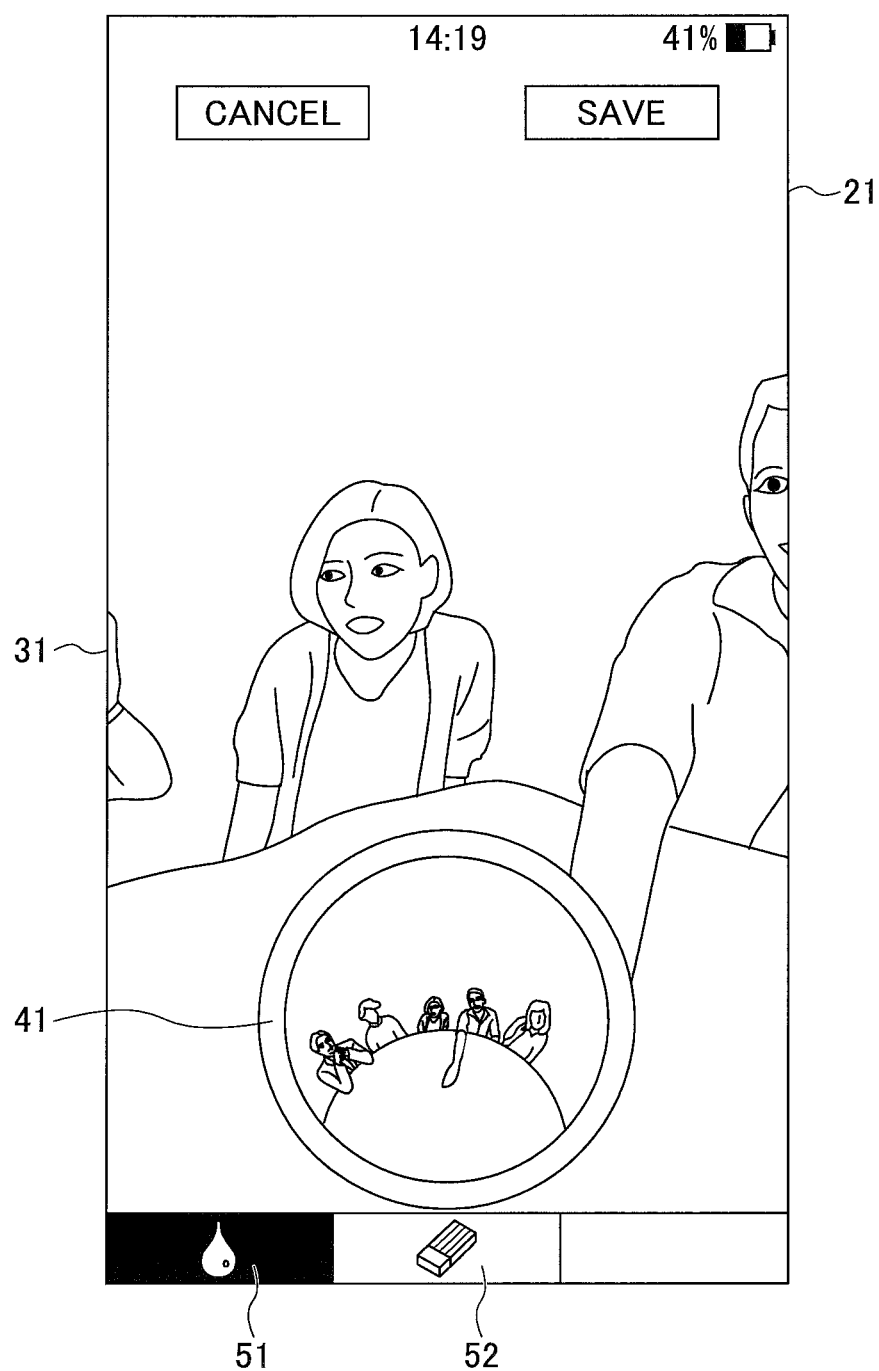
FIG. 11 is a diagram that illustrates one example of an output image at an initial state for executing editing of an image according to one embodiment of the present invention.

FIG. 11 is a diagram that illustrates one example of an output image at an initial state for editing an image according to one embodiment of the present invention.

An output image is, for example, an output image 21 at an initial state. An output image has an editing image 31 at an initial state and a changing image 41 at an initial state.

An output image displays a button for a Graphical User Interface (GUI) for accepting an operation of a user. A GUI is, for example, a blur editing button 51, a cancellation editing button 52, or the like. Here, an output image may have another GUI.

An editing image 31 at an initial state is, for example, an initial image produced at step S0705.

A changing image 41 at an initial state is, for example, an image provided by reducing an all celestial sphere panoramic image produced at step S0703.

A user edits an image in an image editing mode, and hence, applies an operation to an editing image or a changing image that is displayed in an output image.

At step S0708, the smartphone 2 executes a process for causing a user to input an operation for editing an image.

At step S0709, the smartphone 2 acquires coordinates where a user inputs an operation for the input/output device 2H3. At step S0709, the smartphone 2 executes a process for determining whether an operation is executed for an area of the editing image 31 at an initial state in FIG. 11 or an operation is executed for an area of the changing image 41 at an initial state in FIG. 11, based on acquired coordinates.

Image editing is editing that is executed based on an operation of a user. Editing of an area to be output is editing for changing an area to be output in an image based on a changing image or editing executed for a predetermined area based on an editing image.

Editing for changing an area to be output is executed in a case where an operation is applied to an area of a changing image at step S0709.

Editing to be executed for a predetermined area based on an editing image is executed in a case where an operation is applied to an area of an editing image at step S0709.

In a case where a user operates a changing image (an area of a changing image is determined at step S0709), the smartphone 2 goes to step S0710. In a case where a user operates an editing image (an area of an editing image is determined at step S0709), the smartphone 2 goes to step S0712.

<Editing for Changing an Area to be Output>

Figure 12A:
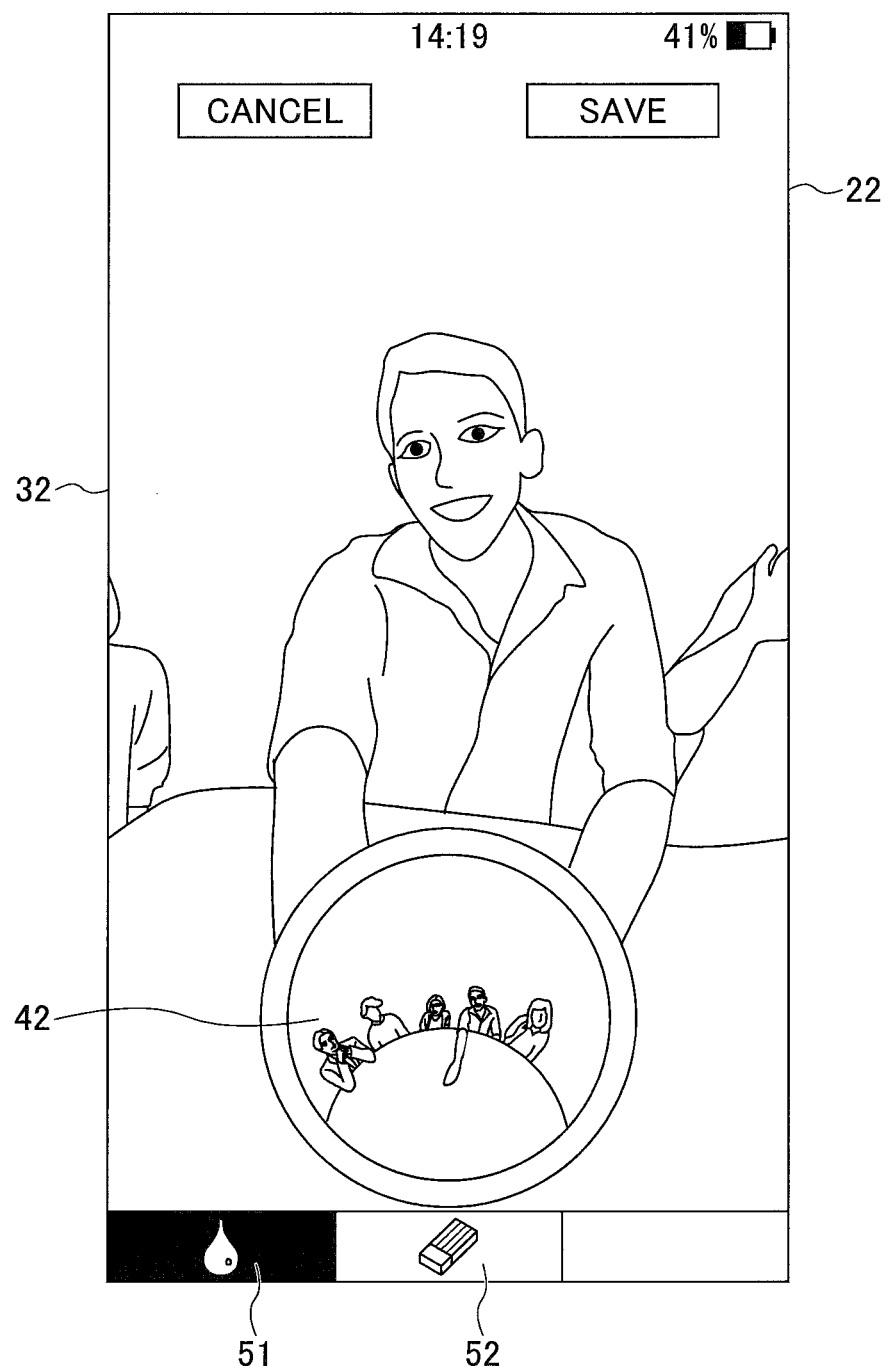
Figure 12C:
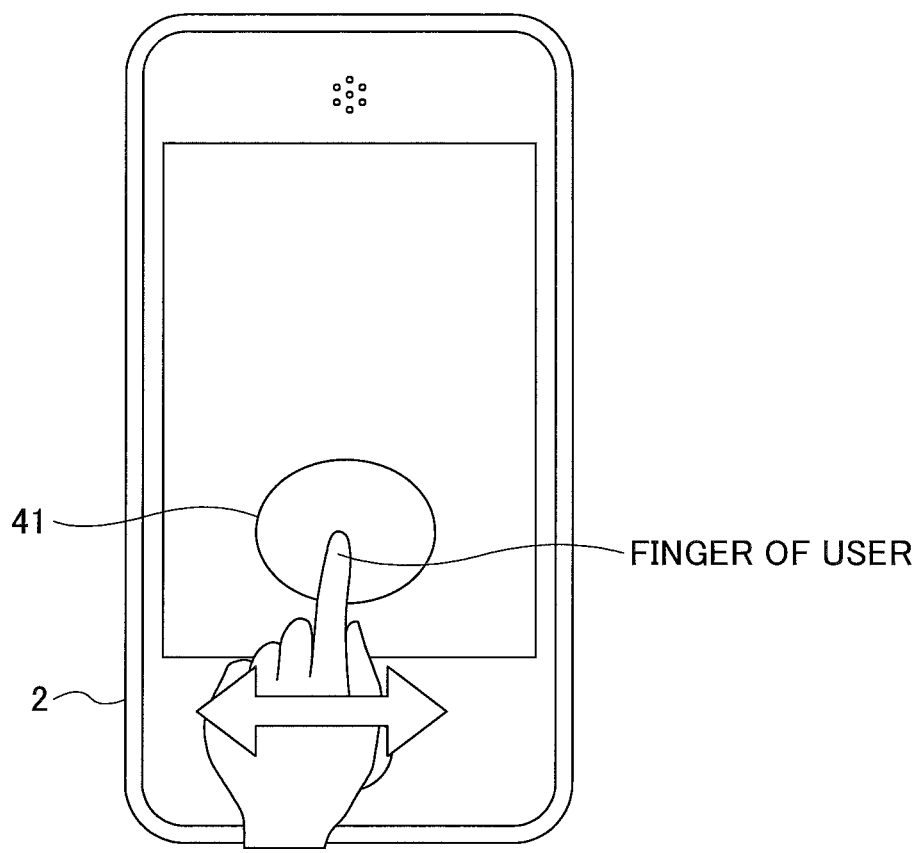

FIG. 12A, FIG. 12B, and FIG. 12C are diagrams for illustrating one example of editing of an area to be output according to one embodiment of the present invention.

FIG. 12A is a diagram that illustrates one example of an output image after editing an area to be output according to one embodiment of the present invention.

An output image is, for example, an output image 22 after editing an area to be output. The output image 22 after editing an area to be output has an editing image 32 after editing an area to be output and a changing image 42 after editing an area to be output.

The editing image 32 after editing an area to be output is an image produced by changing a predetermined area T as illustrated in FIG. 10A, FIG. 10B, FIG. 10O, and FIG. 10D in the editing image 31 at an initial state in FIG. 11.

The changing image 42 after editing an area to be output is an image produced by changing a predetermined area T illustrated in FIG. 10A, FIG. 10B, FIG. 10O, and FIG. 10D in the changing image 41 at an initial state in FIG. 11.

FIG. 12B is a diagram that illustrates one example of a predetermined area after editing an area to be output according to one embodiment of the present invention.

The output image 22 after editing an area to be output is provided at, for example, a viewpoint of a case where the virtual camera 3 at a state of FIG. 10B is pan-rotated as illustrated in FIG. 12B.

FIG. 12C is a diagram that illustrates one example of an operation in a case of editing of an area to be output according to one embodiment of the present invention.

Editing of an area to be output is executed in such a manner that a user operates a screen area where a changing image is output.

An operation to be input at step S0708 is, for example, an operation for changing an area to be output with respect to left and right directions of an image or the like.

In a case of FIG. 12A, FIG. 12B, and FIG. 12C, an operation that is input by a user is such that a screen where the changing image 41 at an initial state in FIG. 11 is traced with a finger in left and right directions of such a screen as illustrated in FIG. 12C, that is, a so-called "swipe operation", or the like.

Herein, an input amount on a swipe operation is provided as (dx, dy).

A relation between a polar coordinate system ($\phi$, $\theta$) of an all celestial sphere in FIG. 8A, FIG. 8B, FIG. 8C, and FIG. 8D and an input amount (dx, dy) is represented by Formula (2) described below:

$$\phi = k \times dx$$

$$\theta = k \times dy \quad \text{(Formula 2)}$$

In Formula (2) described above, k is a predetermined constant for executing adjustment.

An output image is changed based on an input amount input for a swipe operation, and hence, it is possible for a user to operate an image with a feeling that a sphere such as a terrestrial globe is rotated.

Here, for simplifying a process, what position of a screen a swipe operation is input at may not be taken into consideration. That is, similar values may be input for an input amount (dx, dy) in Formula (2) even though a swipe operation is executed at any position of a screen where the changing image 41 at an initial state is output.

The changing image 42 after editing an area to be output executes perspective projection transformation of coordinates (Px, Py, Pz) of a vertex P in three-dimensional space based on ($\phi$, $\theta$) calculated in accordance with Formula (2).

In a case where a user executes a swipe operation with an input amount (dx2, dy2) in a case of FIG. 12A, a polar coordinate system ($\phi$, $\theta$) of an all celestial sphere is represented by Formula (3) described below:

$$\phi = k \times (dx + dx2)$$

$$\theta = k \times (dy + dy2) \quad \text{(Formula 3)}$$

As illustrated in (3) described above, a polar coordinate system ($\phi$, $\theta$) of an all celestial sphere is calculated based on a total value of input amounts for respective swipe operations. Even in a case where a plurality of swipe operations are executed or the like, calculation of a polar coordinate system ($\phi$, $\theta$) of an all celestial sphere is executed, and thereby, it is possible to keep constant operability.

Here, editing of an area to be output is not limited to pan-rotation. For example, tilt-rotation of the virtual camera 3 in upper and lower directions of an image may be realized.

An operation that is input at step S0708 is, for example, an operation for enlarging or reducing an area to be output or the like.

Figure 13A:
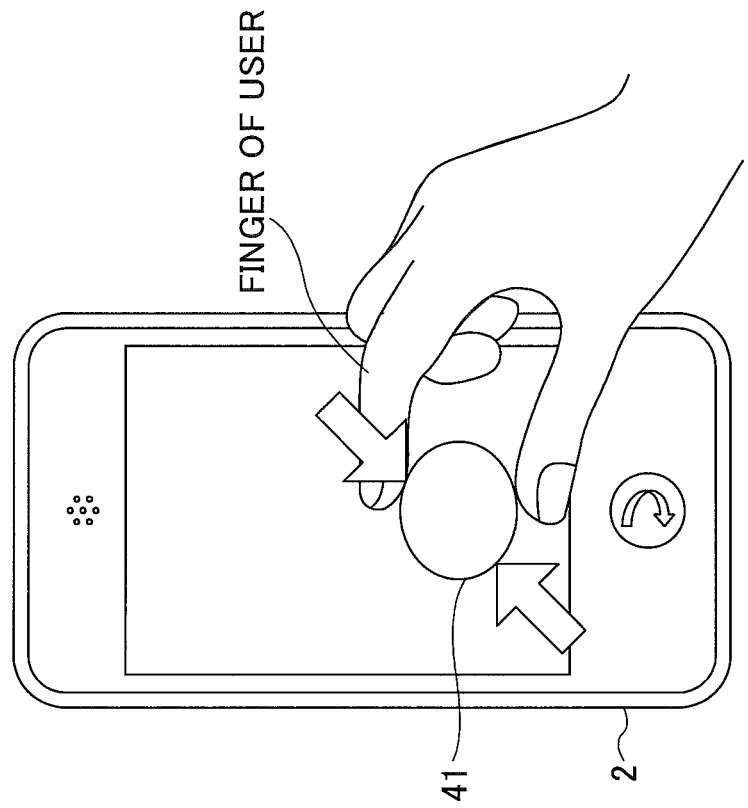
FIG. 13A and FIG. 13B are diagrams for illustrating one example of enlargement or reduction of an area to be output according to one embodiment of the present invention.
Figure 13B:
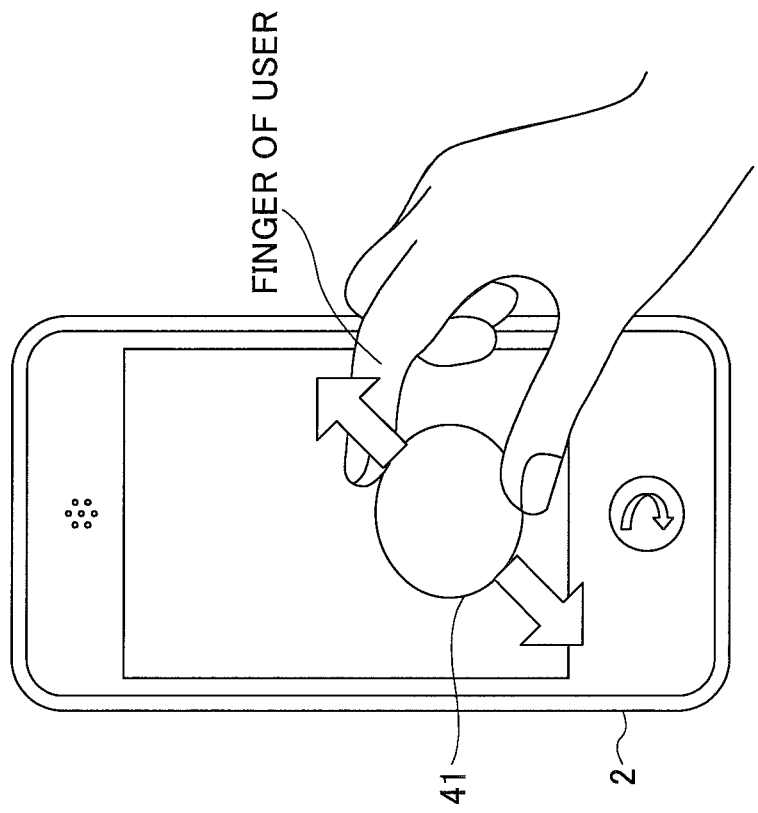

FIG. 13A and FIG. 13B are diagrams for illustrating one example of enlargement or reduction of an area to be output according to one embodiment of the present invention.

In a case where enlargement of an area to be output is executed, an operation that is input by a user is such that two fingers are spread on a screen where the changing image 41 at an initial state in FIG. 11 is output, as illustrated in FIG. 13A, that is, a so-called "pinch-out operation", or the like.

In a case where reduction of an area to be output is executed, an operation that is input by a user is such that two fingers are moved closer to each other on a screen where the changing image 41 at an initial state in FIG. 11 is output, as illustrated in FIG. 13B, that is, a so-called "pinch-in operation", or the like.

Here, a pinch-out or pinch-in operation is sufficient as long as a position where a finger of user first contacts is provided in an area with a changing image displayed thereon, and may be an operation that subsequently uses an area with an editing image displayed thereon. Furthermore, an operation may be executed by a so-called "stylus pen" that is a tool for operating a touch panel or the like.

In a case where an operation illustrated in FIG. 13A and FIG. 13B is input, the smartphone 2 executes a so-called "zoom process".

A zoom process is a process for producing an image with a predetermined area enlarged or reduced based on an operation that is input by a user.

In a case where an operation illustrated in FIG. 13A and FIG. 13B is input, the smartphone 2 acquires an amount of change dz based on an operation that is input by a user.

A zoom process is a process for executing calculation in accordance with Formula (4) described below:

$$\alpha = \alpha 0 + m \times dz \quad \text{(Formula 4)}$$

based on an amount of change dz.

α indicated in Formula (4) described above is a view angle α of the virtual camera 3 as illustrated in FIG. 10A, FIG. 10B, FIG. 10O, and FIG. 10D. m indicated in Formula (4) is a coefficient for adjusting an amount of zoom. α0 indicated in Formula (4) is a view angle α at an initial state, that is, a view angle α in a case where an initial image is produced at step S0705.

In a case where an operation illustrated in FIG. 13A and FIG. 13B is input, the smartphone 2 determines a range of a predetermined area T in FIG. 10A, FIG. 10B, FIG. 10O, and FIG. 10D by using a view angle α calculated in accordance with Formula (4) for a projection matrix.

In a case where calculation is executed in accordance with Formula (4) and a user executes an operation for providing an amount of change dz2, the smartphone 2 executes calculation in accordance with Formula (5) described below:

$$\alpha = \alpha 0 + m \times (dz + dz2) \quad \text{(Formula 5)}$$

As indicated in (5) described above, a view angle α is calculated based on a total value of amounts of change due to operations as illustrated in FIG. 13A and FIG. 13B. Even in a case where a plurality of operations as illustrated in FIG. 13A and FIG. 13B are executed or the like, calculation of a view angle α of a celestial sphere is executed, and thereby, it is possible to keep constant operability.

Here, a zoom process is not limited to a process in accordance with Formula (4) or Formula (5).

A zoom process may be realized by combining a view angle α of the virtual camera 3 and a change in a position of a viewpoint.

Figure 14:
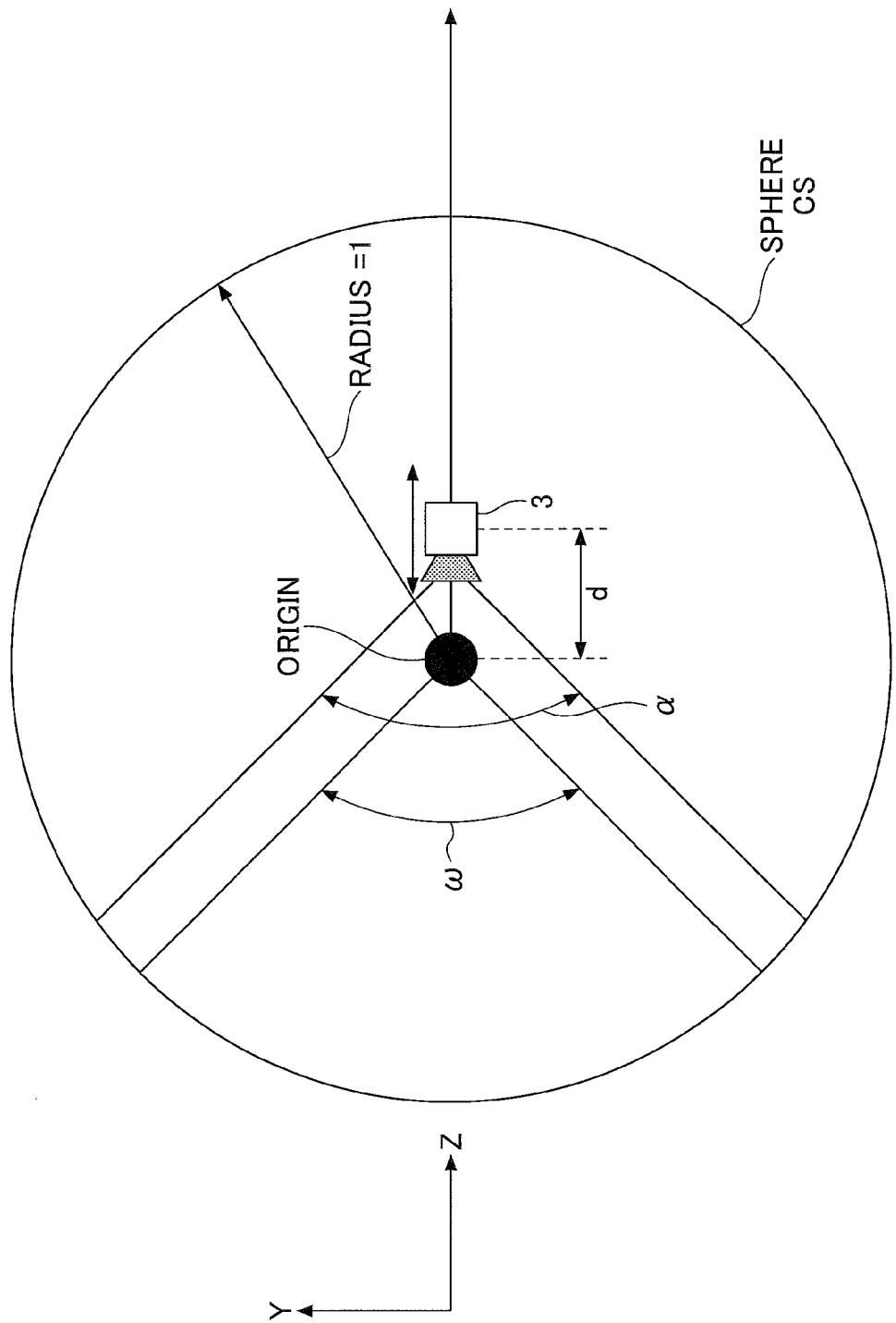
FIG. 14 is a diagram for illustrating one example of another zoom process according to one embodiment of the present invention.

FIG. 14 is a diagram for illustrating one example of another zoom process according to one embodiment of the present invention.

FIG. 14 is a model diagram for illustrating another zoom process. A sphere CS in FIG. 14 is similar to a sphere CS in FIG. 10A, FIG. 10B, FIG. 10C, and FIG. 10D. In FIG. 14, a radius of a sphere CS is described as "1".

An origin in FIG. 14 is provided at an initial position of the virtual camera 3. A position of the virtual camera 3 is changed on an optical axis, that is, a z-axis in FIG. 10A. It is possible to represent an amount of movement d of the virtual camera 3 by a distance from an origin. For example, in a case where the virtual camera 3 is positioned at an origin, that is, a case of an initial state, an amount of movement d is "0".

A range of a predetermined area T in FIG. 10A, FIG. 10B, FIG. 10O, and FIG. 10D is represented by an angle of view ω based on an amount of movement d and a view angle α of the virtual camera 3. An angle of view ω as illustrated in FIG. 14 is an angle of view in a case where the virtual camera 3 is positioned at an origin, namely, a case of d=0.

In a case where the virtual camera 3 is positioned at an origin, namely, a case of d=0, an angle of view ω is identical to a view angle α. In a case where the virtual camera 3 is displaced from an origin, that is, a case where a value of d is increased, an angle of view ω and a view angle α exhibit different ranges.

Another zoom process is a process for changing an angle of view ω.

FIG. 15 is a table for illustrating one example of another zoom process according to one embodiment of the present invention.

Illustrative table 4 illustrates an example of a case where an angle of view ω is a range of 60° to 300°.

As illustrated in illustrative table 4, the smartphone 2 determines which of a view angle α and an amount of movement d of the virtual camera 3 is preferentially changed based on a zoom specification value ZP.

"RANGE" is a range that is determined based on a zoom specification value ZP.

"OUTPUT MAGNIFICATION" is an output magnification of an image calculated based on an image parameter determined by another zoom process.

"ZOOM SPECIFICATION VALUE ZP" is a value that corresponds to an angle of view to be output. Another zoom process changes a process for determining an amount of movement d and a view angle α based on a zoom specification value ZP. For a process to be executed in another zoom process, one of four methods is determined based on a zoom specification value ZP as illustrated in illustrative table 4. A range of a zoom specification value ZP is divided into four ranges that are a range of A-B, a range of B-C, a range of C-D, and a range of D-E.

"ANGLE OF VIEW ω" is an angle of view ω that corresponds to an image parameter determined by another zoom process.

"CHANGING PARAMETER" is a description that illustrates a parameter that is changed by each of four methods based on a zoom specification value ZP. "REMARKS" are remarks for "CHANGING PARAMETER".

"viewWH" in illustrative table 4 is a value that represents a width or a height of an output area. In a case where an output area is laterally long, "viewWH" is a value of a width. In a case where an output area is longitudinally long, "viewWH" is a value of a height. That is, "viewWH" is a value that represents a size of an output area in longitudinal direction.

"imgWH" in illustrative table 4 is a value that represents a width or a height of an output image. In a case where an output area is laterally long, "imgWH" is a value of a width of an output image. In a case where an output area is longitudinally long, "imgWH" is a value of a height of an output image. That is, "imgWH" is a value that represents a size of an output image in longitudinal direction.

"imageDeg" in illustrative table 4 is a value that represents an angle of a display range of an output image. In a case where a width of an output image is represented, "imageDeg" is 360°. In a case where a height of an output image is represented, "imageDeg" is 180°.

FIG. 16A, FIG. 16B, FIG. 16C, FIG. 16D, and FIG. 16E are diagrams for illustrating one example of a "range" of another zoom process according to one embodiment of the present invention.

A case of a so-called "zoom-out" in FIG. 16A, FIG. 16B, FIG. 16C, FIG. 16D, and FIG. 16E will be described as an example below. Here, a left figure in each figure of FIG. 16A, FIG. 16B, FIG. 16C, FIG. 16D, and FIG. 16E illustrates one example of an image to be output. A right figure in each figure of FIG. 16A, FIG. 16B, FIG. 16C, FIG. 16D, and FIG. 16E is a diagram that illustrates one example of a state of the virtual camera 3 at a time of an output in a model diagram illustrated in FIG. 14.

FIG. 16A is one example of an output in a case where a zoom specification value ZP is input in such a manner that a "RANGE" in illustrative table 4 in FIG. 15 is "A-B". In a case of "A-B", a view angle α of the virtual camera 3 is fixed at, for example α=60°. In a case of "A-B", an amount of movement d of the virtual camera 3 is changed on a condition that a view angle α is fixed as illustrated in FIG. 16A. In a case where an amount of movement d of the virtual camera 3 is increased on a condition that a view angle α is fixed, an angle of view ω is increased. In a case of "A-B", a view angle α is fixed and an amount of movement d of the virtual camera 3 is increased, so that it is possible to realize a zoom-out process. Here, an amount of movement d of the virtual camera 3 in a case of "A-B" is from 0 to a radius of a sphere CS. That is, a radius of a sphere CS is "1" in a case of FIG. 16A, FIG. 16B, FIG. 16C, FIG. 16D, and FIG. 16E, and hence, an amount of movement d of the virtual camera 3 is a value within a range of 0-1. An amount of movement d of the virtual camera 3 is a value that corresponds to a zoom specification value ZP.

FIG. 16B is one example of an output in a case where a zoom specification value ZP is input in such a manner that "RANGE" in illustrative table 4 in FIG. 15 is "B-C". "B-C" is a case where a zoom specification value ZP is a value greater than that of "A-B". In a case of "B-C", an amount of movement d of the virtual camera 3 is fixed at a value for positioning the virtual camera 3 at a periphery of a sphere CS. That is, as illustrated in FIG. 16B, an amount of movement d of the virtual camera 3 is fixed at "1" that is a radius of a sphere CS. In a case of "B-C", a view angle α is changed on a condition that an amount of movement d of the virtual camera 3 is fixed. In a case where a view angle α is increased on a condition that an amount of movement d of the virtual camera 3 is fixed, an angle of view ω is increased from FIG. 16A to FIG. 16B. In a case of "B-C", an amount of movement d of the virtual camera 3 is fixed and a view angle α is increased, so that it is possible to realize a zoom-out process. In a case of "B-C", a view angle α is calculated as ω/2. In a case of "B-C", a range of a view angle α is from 60° that is a value fixed in a case of "A-B" to 120°.

In a case of "A-B" or "B-C", an angle of view ω is identical to a zoom specification value ZP. In a case of "A-B" or "B-C", a value of an angle of view ω is increased.

FIG. 16C is one example of an output in a case where a zoom specification value ZP is input in such a manner that "RANGE" in illustrative table 4 in FIG. 15 is "C-D". "C-D" is a case where a zoom specification value ZP is a value greater than that of "B-C". In a case of "C-D", a view angle α is fixed at, for example, α=120°. In a case of "C-D", an amount of movement d of the virtual camera 3 is changed on a condition that a view angle α is fixed as illustrated in FIG. 16C. In a case where an amount of movement d of the virtual camera 3 is increased on a condition that a view angle α is fixed, an angle of view ω is increased. An amount of movement d of the virtual camera 3 is calculated in accordance with a formula based on a zoom specification value ZP illustrated in illustrative table 4 I FIG. 15. In a case of "C-D", an amount of movement d of the virtual camera 3 is changed to a maximum display distance dmax1.

A maximum display distance dmax1 is a distance where a sphere CS is displayed so as to be maximum in an output area of the smartphone 2. An output area is, for example, a size of a screen where the smartphone 2 outputs an image or the like, or the like. A maximum display distance dmax1 is, for example, a case of FIG. 16D. A maximum display distance dmax1 is calculated in accordance with Formula (6) described below:

$$dmax1 = \frac{1}{\sin\left\{a\tan\left[\tan\left(\frac{\omega}{2}\right) * \frac{(viewW^2 + viewH^2)^{\frac{1}{2}}}{viewW}\right]\right\}} \quad \text{(Formula 6)}$$

"viewW" in Formula (6) described above is a value that represents a width of an output area of the smartphone 2. "viewH" in Formula (6) described above is a value that represents a height of an output area of the smartphone 2. A similar matter will be described below.

A maximum display distance dmax1 is calculated based on values of "viewW" and "viewH" that are output areas of the smartphone 2.

FIG. 16D is one example of an output in a case where a zoom specification value ZP is input in such a manner that "RANGE" in illustrative table 4 in FIG. 15 is "D-E". "D-E" is a case where a zoom specification value ZP is a value greater than that of "C-D". In a case of "D-E", a view angle α is fixed at, for example, α=120°. In a case of "D-E", an amount of movement d of the virtual camera 3 is changed on a condition that a view angle α is fixed as illustrated in FIG. 16D. An amount of movement d of the virtual camera 3 is changed to a limit display distance dmax2. A limit display distance dmax2 is a distance where a sphere CS is displayed so as to be inscribed in an output area of the smartphone 2. A limit display distance dmax2 is calculated in Formula (7) described below:

$$dmax2 = \frac{1}{\sin\left\{a\tan\left[\tan\left(\frac{\omega}{2}\right) * \frac{viewH}{viewW}\right]\right\}} \quad \text{(Formula 7)}$$

A limit display distance dmax2 is, for example, a case of FIG. 16E.

A limit display distance dmax2 is calculated based on values of "viewW" and "viewH" that are output areas of the smartphone 2. A limit display distance dmax2 represents a maximum range that is able to be output by the smartphone 2, that is, a limit value of an amount of movement d of the virtual camera 3. An embodiment may be limited in such a manner that a zoom specification value ZP is included in a range illustrated in illustrative table 4 in FIG. 15, that is, a value of an amount of movement d of the virtual camera 3 is less than or equal to a limit display distance dmax2. Due to such limitation, the smartphone 2 is provided on a condition that an output image is fitted to a screen that is an output area or a condition that an image with a predetermined output magnification is output to a user, so that it is possible to realize zoom-out.

Due to a process for "D-E", it is possible for the smartphone 2 to cause a user to recognize that an output image is all celestial sphere panorama.

Here, in a case of "C-D" or "D-E", an angle of view ω is not identical to a zoom specification value ZP. Furthermore, as illustrated in illustrative table 4 in FIG. 15 and FIG. 16A, FIG. 16B, FIG. 16C, FIG. 16D, and FIG. 16E, an angle of view ω is continuous in each range but such an angle of view w is not uniformly increased by zoom-out toward a wide-angle side. That is, in a case of "C-D" where an amount of movement d of the virtual camera 3 is changed, an angle of view ω is increased with such an amount of movement d of the virtual camera 3. In a case of "D-E" where an amount of movement d of the virtual camera 3 is changed, an angle of view ω is decreased with such an amount of movement d of the virtual camera 3. A decrease in an amount of movement d of the virtual camera 3 in "D-E" is caused by reflecting an outer area of a sphere CS. In a case where a wide field of view greater than or equal to 240° is specified by a zoom specification value ZP, the smartphone 2 changes an amount of movement d of the virtual camera 3, and thereby, it is possible to output an image with a less feeling of strangeness to a user and change an angle of view ω.

In a case where a zoom specification value ZP is changed toward a wide-angle direction, an angle of view ω is frequently increased. In a case where an angle of view ω is increased, the smartphone 2 fixes a view angle α of the virtual camera 3 and increases an amount of movement d of the virtual camera 3. The smartphone 2 fixes a view angle α of the virtual camera 3, and thereby, it is possible to reduce an increase in such a view angle α of the virtual camera 3. The smartphone 2 reduces an increase in a view angle α of the virtual camera 3, and thereby, it is possible to output an image with less distortion to a user. In a case where a view angle α of the virtual camera 3 is fixed, the smartphone 2 increases an amount of movement d of the virtual camera 3, that is, moves the virtual camera 3 to be distant, and thereby, it is possible to provide a user with an open-feeling of a wide angle display. Furthermore, movement for moving the virtual camera 3 to be distant is similar to movement at a time when a human being confirms a wide range, and hence, it is possible for the smartphone 2 to realize zoom-out with a less feeling of strangeness due to movement for moving the virtual camera to be distant.

In a case of "D-E", an angle of view ω is decreased with changing a zoom specification value ZP toward a wide-angle direction. In a case of "D-E", the smartphone 2 decreases an angle of view ω, and thereby, it is possible to provide a user with a feeling of being distant from a sphere CS. The smartphone 2 provides a user with a feeling of being distant from a sphere CS, and thereby, it is possible to output an image with a less feeling of strangeness to a user.

Hence, it is possible for the smartphone 2 to output an image with a less feeling of strangeness to a user, due to another zoom process illustrated in illustrative table 4 in FIG. 15.

Here, an embodiment is not limited to a case where only an amount of movement d or a view angle α of the virtual camera 3 illustrated in illustrative table 4 in FIG. 15 is changed. It is sufficient for an embodiment to be a mode for preferentially changing an amount of movement d or a view angle α of the virtual camera 3 on a condition illustrated in illustrative table 4 in FIG. 15, and a fixed value may be changed to a sufficiently small value, for example, for adjustment.

Furthermore, an embodiment is not limited to zoom-out. An embodiment may realize, for example, zoom-in.

Here, a case where an area to be output is edited is not limited to a case where an operation is executed for a changing image. The smartphone 2 may edit an area to be output, for example, in a case where an operation is executed for an editing image.

<Editing to be Executed for a Predetermined Area Based on an Editing Image>

Editing to be executed for a predetermined area based on an editing image is blur editing that blurs a predetermined pixel. Herein, for another editing, it is possible to provide, erasing of a specified range of an image, changing of a color tone or a color depth of an image or the like, a color change of a specified range of an image, or the like.

A case where a user executes blur editing for the output image 22 after editing of an area to be output in FIG. 12A, FIG. 12B, and FIG. 12C will be described as an example below.

In a case where a user executes an operation that pushes a blur editing button 51, the smartphone 2 causes a user to input a so-called "tap operation" for an area where an editing image 32 for the output image 22 after editing of an area to be output in FIG. 12A, FIG. 12B, and FIG. 12C is displayed.

The smartphone 2 executes a process for blurring a predetermined range centered at a point tapped by a user.

Figure 17A:
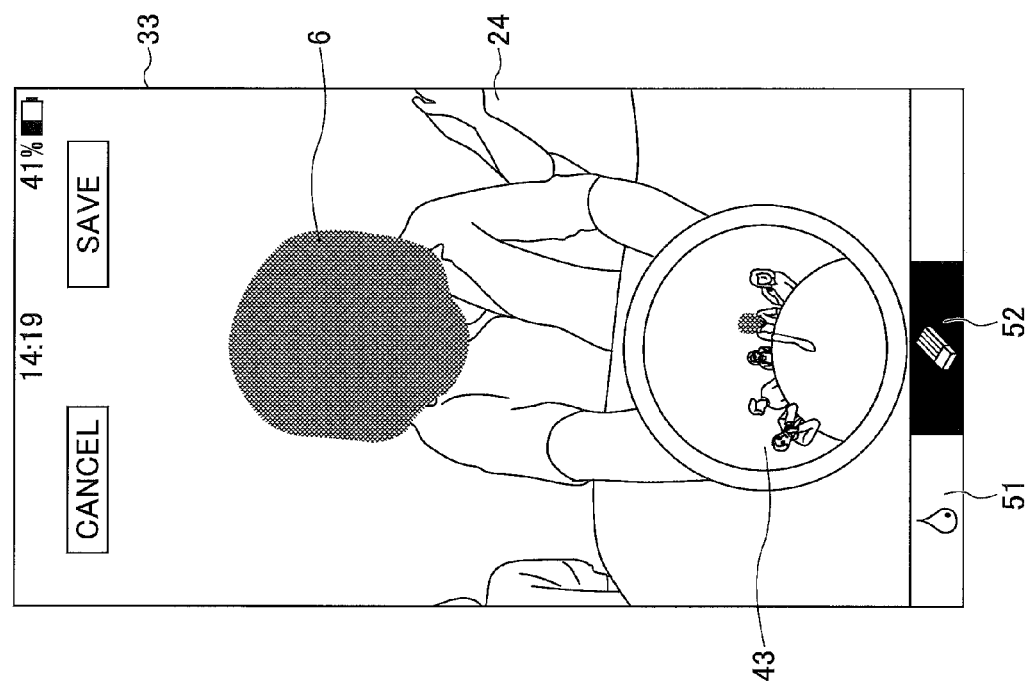
FIG. 17A and FIG. 17B are diagrams for illustrating one example of editing that is executed for a predetermined area based on an editing image according to one embodiment of the present invention.
Figure 17B:
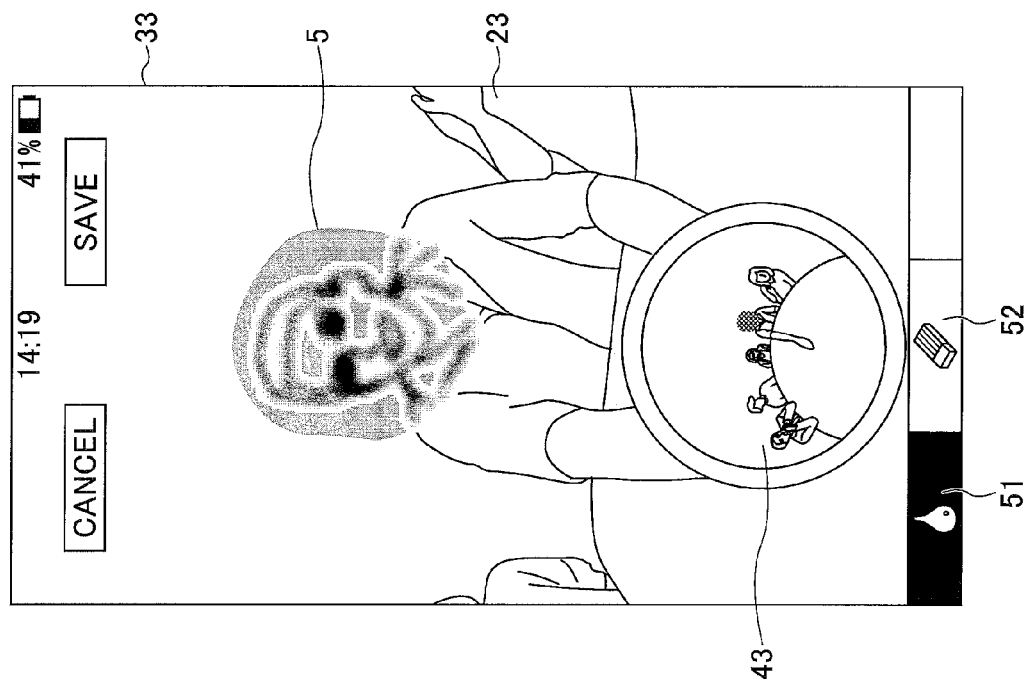

FIG. 17A and FIG. 17B are diagrams for illustrating one example of editing to be executed for a predetermined area based on an editing image according to one embodiment of the present invention.

FIG. 17A is a diagram for illustrating one example of blur editing according to one embodiment of the present invention. FIG. 17A is a diagram that illustrates an output image 23 after blur editing. The output image 23 after blur editing has an editing image 33 after blur editing and a changing image 43 after blur editing.

The editing image 33 after blur editing is produced by applying blur editing to an output image after editing of an area to be output in FIG. 12A, FIG. 12B, and FIG. 12C. Blur editing is realized by, for example, a Gauss function, an average of peripheral pixels, a low-pass filter, or the like. Blur editing is illustrated like, for example, a blur editing area 5.

Blur editing is applied to a changing image. The smartphone 2 executed calculation of a point (Px, Py, Pz) in a three-dimensional space from coordinates of a point tapped by a user. The smartphone 2 calculates (Px, Py, Pz) from two-dimensional coordinates through inverse transformation of perspective projection transformation that uses a view frustum. There is no information of depth in two-dimensional coordinates, and hence, (Px, Py, Pz) are calculated by using a point on a sphere and simultaneous equations. A sign of Pz in a projection coordinate system is constant, and hence, it is possible for the smartphone 2 to calculate simultaneous equations. Coordinates of an all celestial sphere panoramic image correspond to (Px, Py, Pz), and hence, it is possible for the smartphone 2 to calculate coordinates on an all celestial sphere panoramic image from calculated (Px, Py, Pz). Therefore, a changing image 43 after blur editing is provided on a condition that blur editing is reflected as illustrated in FIG. 17A.

FIG. 17B is a diagram for illustrating one example of editing that cancels blurring according to one embodiment of the present invention.

Editing that is applied to a predetermined area based on an editing image is editing that cancels blur editing for a blur editing area 5 blurred by such blur editing.

In a case where a user executes an operation that pushes the cancellation editing button 52, the smartphone 2 outputs an output image 24 for cancellation editing that displays a filling area 6 on the blur editing area 5 with applied blur editing. As illustrated in FIG. 17B, the output image 24 for cancellation editing is an image that displays the filling area 6 on the blur editing area 5 in the editing image 33 after blur editing in FIG. 17A. A user executes a tap operation for a displayed filling area 6, that is, an area with applied blurring. The smartphone 2 executes a process for cancelling blur editing in a predetermined range centered at a point tapped by a user. That is, in editing for cancelling blur editing, the smartphone 2 provides a predetermined range centered at a point tapped by a user in the editing image 33 after blur editing on a state of the output image 22 after editing of an area to be output in FIG. 12A, FIG. 12B, and FIG. 12C.

Once a taken image of a face of a person or a photography-prohibited building is released or shared on the internet, trouble may be caused. In particular, in a case where a panoramic image with a broad range is taken, an image of many objects in a broad range may frequently be taken. Therefore, it is possible for a user to reduce trouble due to a process for blurring an object that is possibly problematic at a time of release or sharing. It is possible for the smartphone 2 to facilitate an operation for blurring a face of a person taken in an image due to editing to be applied to a predetermined area based on an editing image. Hence, it is possible for the smartphone 2 to cause a user to readily execute an image operation due to editing to be applied to a predetermined area based on an editing image.

Here, in a case where editing of an area to be output is executed, the smartphone 2 may change a range of editing applied to a predetermined area based on an editing image or the like in accordance with a magnification.

At step S0710, the smartphone 2 calculates amounts of movement of coordinates to be output. That is, at step S0710, the smartphone 2 calculates a position of a predetermined area T in FIG. 10A, FIG. 10B, FIG. 10C, and FIG. 10D that corresponds to a swipe operation of a user based on, for example, Formula (2) described above.

At step S0711, the smartphone 2 updates a position of a predetermined area T in FIG. 10A, FIG. 10B, FIG. 100, and FIG. 10D at a position calculated at step S0710.

At step S0712, the smartphone 2 calculates coordinates of a point that is an editing object. That is, at step S0712, the smartphone 2 calculates coordinates that correspond to a tap operation of a user and executes calculation for projection onto three-dimensional coordinates.

At step S0713, the smartphone 2 calculates a predetermined area that is edited centered at coordinates calculated at step S0712 and based on an editing image. That is, at step S0713, the smartphone 2 calculates a pixel that is a point specified by a tap operation of a user or a periphery of such a point and is an object for blur editing or the like.

At step S0714, the smartphone 2 produces an editing image. In a case where a user executes an operation for a changing image at step S0714, the smartphone 2 produces a changing image based on a predetermined area T updated at step S0711. In a case where a user executes an operation for an editing image at step S0714, the smartphone 2 produces an editing image wherein a blurring process is reflected on a pixel calculated at step S0713.

At step S0715, the smartphone 2 produces a changing image. In a case where a user executes an operation for a changing image at step S0715, the smartphone 2 produces a changing image based on a predetermined area T updated at step S0711. In a case where a user executes an operation for an editing image at step S0715, the smartphone 2 produces an changing image that indicates a location that is a blurring object at step S713.

The smartphone 2 repeats processes of step S0708 through step S0715.

<A Process on a Smartphone>

Figure 18:
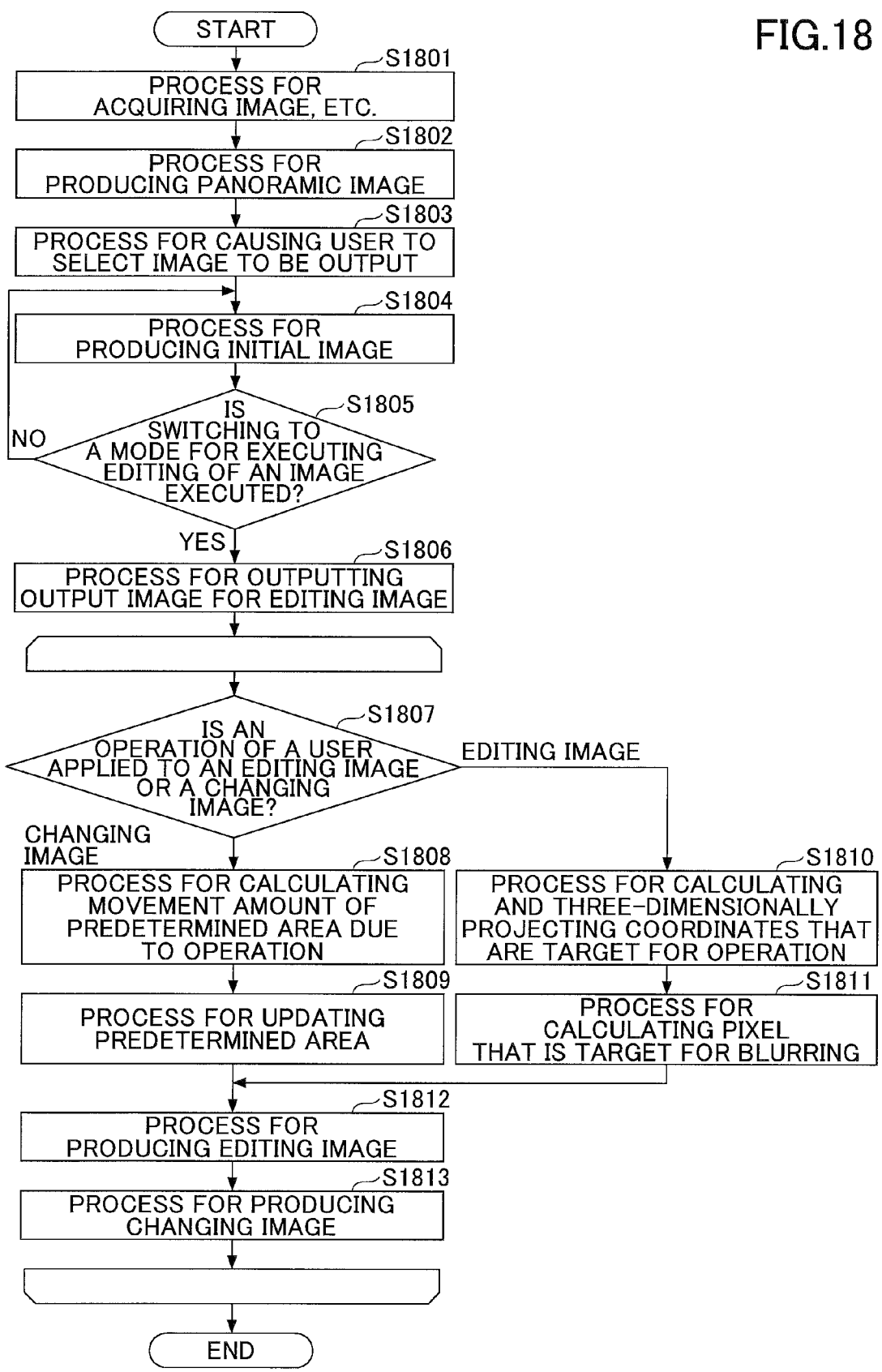
FIG. 18 is a flowchart that illustrates one example of an entire process of a smartphone according to one embodiment of the present invention.

FIG. 18 is a flowchart that illustrates one example of an entire process on a smartphone according to one embodiment of the present invention.

At step S1801, the smartphone 2 executes a process for acquiring an image from the image taking device 1 in FIG. 1 or the like. A process at step S1801 corresponds to a process at step S0702 in FIG. 7.

At step S1802, the smartphone 2 executes a process for producing a panoramic image. A process at step S1802 is executed based on an image acquired at step S1801. A process at step S1802 corresponds to a process at step S0703 in FIG. 7.

At step S1803, the smartphone 2 executes a process for causing a user to select an image to be output. A process at step S1803 corresponds to a process at step S0704 in FIG. 7. Specifically, a process for causing a user to select an image to be output is a process for outputting a thumbnail image or providing a UI for causing a user to execute an operation for a thumbnail image, or the like.

At step S1804, the smartphone 2 executes a process for producing an initial image. A process at step S1804 corresponds to a process at step S0705 in FIG. 7. At step S1804, the smartphone 2 produces and outputs an image selected by a user at step S1803 as an initial image.

At step S1805, the smartphone 2 executes determination as to whether or not switching to a mode for editing an image is executed. A process at step S1805 executes determination based on whether or not an operation of a user at step S0706 in FIG. 7 is provided. In a case where determination is provided at step S1805 in such a manner that switching to a mode for editing an image is provided (YES at step S1805), the smartphone 2 goes to step S1806. In a case where determination is provided at step S1805 in such a manner that switching to a mode for editing an image is not provided (NO at step S1805), the smartphone 2 returns to step S1804.

A case where determination is provided at step S1805 in such a manner that switching to a mode for editing an image is provided is a case where an input to start editing of an image is provided by a user. A case where determination is provided at step S1805 in such a manner that switching to a mode for editing an image is not provided is a case where a user does not execute an operation. Therefore, in a case where a user does not execute an operation, the smartphone 2 continues to output an initial image and waits for an input of an user to start editing of an image.

At step S1806, the smartphone 2 executes a process for outputting an output image for editing an image. A process at step S1806 corresponds to a process at step S0707 in FIG. 7. Furthermore, the smartphone 2 outputs an output image and thereby accepts an operation of a user at step S0708 in FIG. 7.

At step S1807, the smartphone 2 executes determination as to whether an operation of a user is executed for an editing image or a changing image. A process at step S1807 corresponds to a process at step S0709 in FIG. 7. The smartphone 2 executes determination as to whether an operation of a user at step S0708 in FIG. 7 is executed for an editing image or a changing image.

In a case where determination is provided in such a manner that an operation of a user is executed for a changing image (a changing image at step S1807), the smartphone 2 goes to step S1808. In a case where determination is provided in such a manner that an operation of a user is executed for an editing image (an editing image at step S1807), the smartphone 2 goes to step S1810.

At step S1808, the smartphone 2 executes a process for calculating an amount of movement of a predetermined area due to an operation. A process at step S1808 corresponds to a process at step S0710 in FIG. 7. At step S1808, the smartphone 2 calculates an amount of movement for moving a predetermined area based on a swipe operation that is executed by a user and changes such a predetermined area.

At step S1809, the smartphone 2 executes a process for updating a predetermined area. A process at step S1809 corresponds to a process at step S0711 in FIG. 7. At step S1809, the smartphone 2 moves a predetermined area T in FIG. 10A, FIG. 10B, FIG. 10C, and FIG. 10D to a position that corresponds to an amount of movement calculated at step S1808, and updates such a predetermined area T from a position of an initial image to a position that corresponds to a swipe operation of a user.

At step S1810, the smartphone 2 executes a process for calculating, and three-dimensionally projecting, coordinates that are objects for an operation. A process at step S1810 corresponds to a process at step S0712 in FIG. 7. At step S1810, the smartphone 2 calculates coordinates on an all celestial sphere image that corresponds to a point specified by a tap operation of a user.

At step S1811, the smartphone 2 executes a process for calculating a pixel that is an object for blurring. For example, the smartphone 2 has an editing state table that causes flag data as to whether or not an object for blurring is provided, to correspond to each pixel. An editing state table represents whether or not each pixel is output in a blur state. The smartphone 2 refers to an editing state table, determines whether or not each pixel in an output image is output in a blur state, and outputs an image. That is, a process at step S1811 is a process for updating an editing state table. In a case where an operation for either blurring as illustrated in FIG. 17A or cancellation as illustrated in FIG. 17B is provided in a tap operation of a user, the smartphone 2 updates an editing state table based on such an operation.

At step S1812, the smartphone 2 executes a process for producing an editing image. A process at step S1812 corresponds to a process at step S0714 in FIG. 7.

At step S1813, the smartphone 2 executes a process for producing a changing image. A process at step S1813 corresponds to a process at step S0715 in FIG. 7.

Due to processes at step S1812 and step S1813, the smartphone 2 produces an output image and executes an output to a user.

The smartphone 2 returns to step S1807 and repeats previously illustrated processes.

In a case where an object for blurring is provided based on an editing state table at processes at step S1812 and step S1813, the smartphone 2 executes, for example, a blurring process as illustrated in FIG. 17A and an output.

An image that is output to a user by the smartphone 2 is output at 30 or more frames per 1 second in such a manner that such a user feels smooth reproduction of an animation. It is desirable for the smartphone 2 to execute an output at 60 or more frames per 1 second in such a manner that a user feels particularly smooth reproduction. Here, a frame rate of an output may be such that 60 frames per 1 second is changed to, for example, 59.94 frames per 1 second.

Here, processes at step S1812 and step S1813 are not limited to processes for causing the smartphone 2 to execute a blurring process and an output.

For example, the smartphone 2 has an image provided by preliminarily applying a blurring process to all of pixels of an image to be output and an image provided by applying no blurring process. The smartphone 2 outputs each pixel by simultaneously selecting an image provided by executing a blurring process based on an editing state table or an image provided by executing no blurring process. It is possible for the smartphone 2 to reduce an amount of calculation for outputting an image by preliminarily executing a blurring process. That is, it is possible for the smartphone 2 to realize a high-speed image output such as 60 frames per 1 second by executing selection and a simultaneous output of each pixel.

Furthermore, for example, in a case where each pixel is selected and a simultaneously output, the smartphone 2 may store an output image. In a case where a user does not execute an editing operation, the smartphone 2 outputs a stored image. Due to storage, a process for selecting and producing each pixel of an image to be output is not required, and hence, it is possible for the smartphone 2 to reduce an amount of calculation. Therefore, the smartphone 2 stores an output image, and thereby, it is possible to realize a high-speed image output such as 60 frames per 1 second.

Here, an output image is not limited to an image illustrated in FIG. 11 or the like. For example, a shape, a position, a size, or a range of an editing image or a changing image may be changed.

FIG. 19A and FIG. 19B are diagrams for illustrating one example of changing of an output such as a position, a direction, or the like, of a changing image according to one embodiment of the present invention.

An information processing device that is one example of a device for displaying an output image is, for example, the smartphone 2. The smartphone 2 will be described as an example below.

FIG. 19A is a diagram that illustrates one example of changing of an attitude of the smartphone 2 according to one embodiment of the present invention.

For example, a changing image is output to a position 7 before changing as illustrated in FIG. 19A. A case of FIG. 19A will be described as an example below.

For example, an attitude of the smartphone 2 is changed by a user in a direction of rotation as illustrated in FIG. 19A. An attitude of the smartphone 2 is detected by the state sensor 2H4 in FIG. 6. The smartphone 2 rotates and outputs an output image based on an attitude of the smartphone 2 that is a result of detection. The smartphone 2 may change a position or a direction of an area for outputting a changing image based on a result of detection.

FIG. 19B is a diagram that illustrates one example that changes a position or a direction of an area where a changing image is displayed based on a result of detection, according to one embodiment of the present invention.

In a case where a user rotates the smartphone 2 as illustrated in FIG. 19A, the smartphone 2 changes a position of an area for outputting a changing image from a position illustrated as the position 7 before changing in FIG. 19A to a first changing position 71 or a second changing position 72.

Here, a changing image may be output on a condition that a direction for an output is changed based on a result of detection as illustrated in FIG. 19B, that is, rotated from a state of FIG. 19A to that as illustrated in FIG. 19B.

The smartphone 2 changes a position or a direction of an area for outputting a changing image based on a result of detection. That is, it is possible for the smartphone 2 to output an image at a position or in a direction for facilitating an operation of a user even if an attitude of the smartphone 2 is changed, in order to output such an image in accordance with such an attitude.

Furthermore, for changing of a position or a direction of a changing image, the smartphone 2 may display such a changing image so as to bounce during such changing.

<A Functional Configuration>

Figure 20:
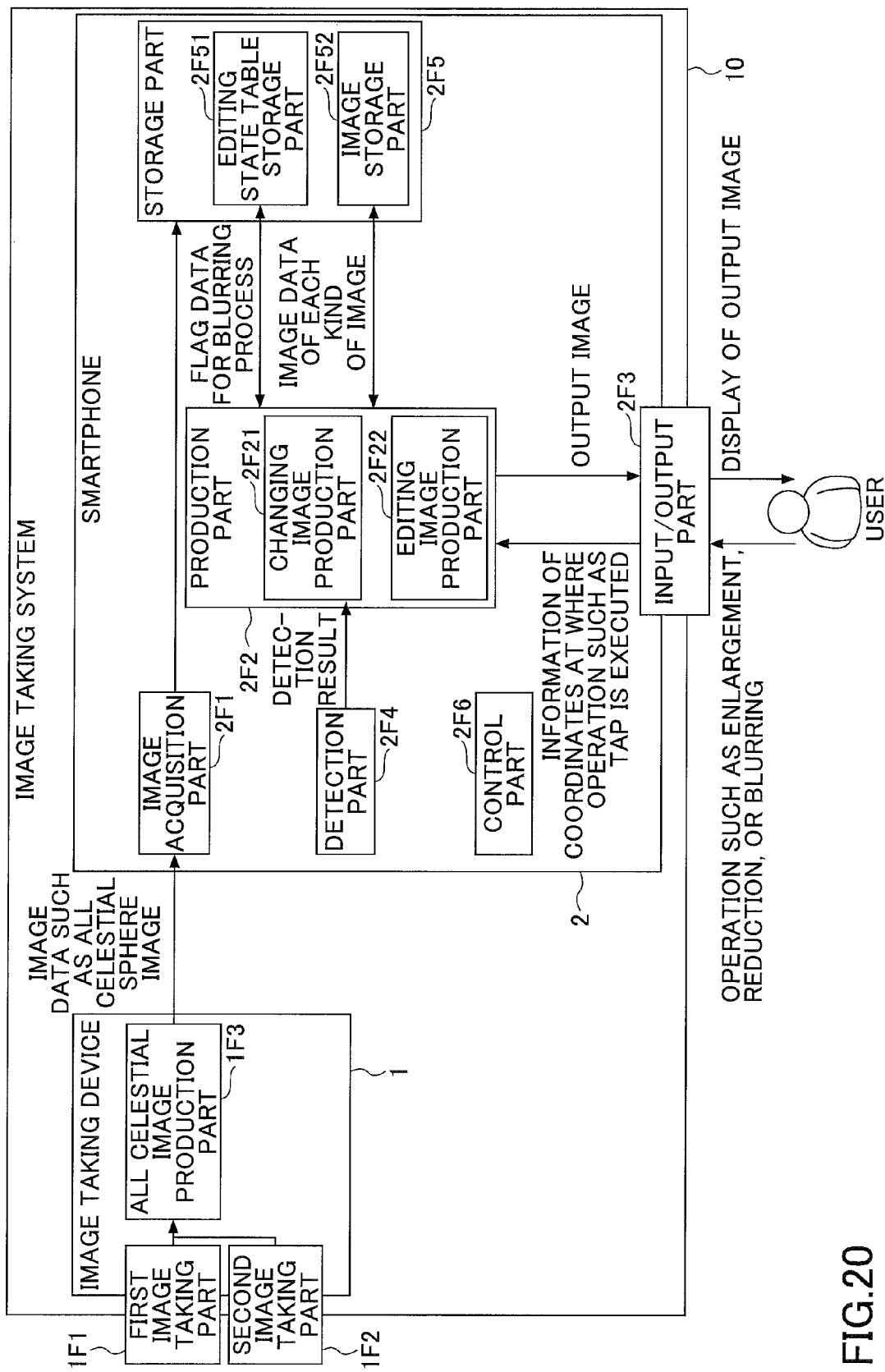
FIG. 20 is a functional diagram for illustrating one example of a functional configuration of an image taking system according to one embodiment of the present invention.

FIG. 20 is a block diagram that illustrates one example of a functional configuration of an image taking system according to one embodiment of the present invention.

The image taking system 10 has the image taking device 1 and the smartphone 2. The image taking system 10 has a first image taking part 1F1, a second image taking part 1F2, and an all celestial sphere image production part 1F3. The image taking system 10 has an image acquisition part 2F1, a production part 2F2, an input/output part 2F3, a detection part 2F4, a storage part 2F5, and a control part 2F6.

The first image talking part 1F1 and the second image taking part 1F2 take and produce images that are materials of an all celestial sphere image. The first image taking part 1F1 is realized by, for example, the front side image taking element 1H1 in FIG. 2A, FIG. 2B, and FIG. 2C or the like. The second image taking part 1F2 is realized by, for example, the back side image taking element 1H2 in FIG. 2A, FIG. 2B, and FIG. 2C or the like. An image that is a material of an all celestial sphere image is, for example, a hemispherical image as illustrated in FIG. 4A or FIG. 4B.

The all celestial sphere image production part 1F3 produces an image that is output to the smartphone 2, such as an all celestial sphere image. The all celestial sphere image production part 1F3 is realized by, for example, the image processing unit 1H7 in FIG. 5 or the like. The all celestial sphere image production part 1F3 produces an all celestial sphere image from hemispherical images that are taken by the first image taking part 1F1 and the second image taking part 1F2.

The image acquisition part 2F1 acquires image data such as an all celestial sphere image from the image taking device 1. The image acquisition part 2F1 is realized by, for example, the network I/F 2H6 in FIG. 6 or the like. The image acquisition part 2F1 executes a process for causing the smartphone 2 to acquire image data such as an all celestial sphere image.

The production part 2F2 executes a process for producing each kind of image and each kind of calculation necessary for production of an image. The production part 2F2 has a changing image production part 2F21 and an editing image production part 2F22. The production part 2F2 is realized by the CPU 2H5 in FIG. 6 or the like.

The changing image production part 2F21 executes a process for executing production of a changing image. The changing image production part 2F21 acquires, for example, image data and an editing state table from the storage part 2F5. The changing image production part 2F21 produces a changing image based on an acquired editing state table and image data.

The editing image production part 2F22 executes a process for executing production of an editing image. The editing image production part 2F22 acquires, for example, image data and an editing state table from the storage part 2F5. The editing image production part 2F22 produces an editing image based on an acquired editing state table and image data.

The production part 2F2 calculates, and stores as an editing state table, coordinates associated with an operation in a case where a user executes a tap or swipe operation. Furthermore, an image produced by the production part 2F2 may be stored in the storage part 2F5 and taken according to a process.

The production part 2F2 may produce each kind of image based on a result of detection that is acquired from the detection part 2F4.

The input/output part 2F3 executes a process for inputting an operation of a user. The input/output part 2F3 causes a user to execute a process for outputting an image produced by the production part 2F2. The input/output part 2F3 is realized by, for example, the input/output device 2H3 in FIG. 6 or the like.

The detection part 2F4 executes a process for detecting an attitude of the smartphone 2. The detection part 2F4 is realized by, for example, the state sensor 2H4 in FIG. 6 or the like.

The storage part 2F5 stores each kind of information acquired or produced by the smartphone 2. The storage part 2F5 has, for example, an editing state table storage part 2F51 and an image storage part 2F52. The storage part 2F5 is realized by, for example, the auxiliary storage device 2H1 or the main storage device 2H2 in FIG. 6 or the like.

The editing state table storage part 2F51 stores data of a table that represents a pixel where a blurring process is executed.

The image storage part 2F52 stores an all celestial sphere image acquired by the image acquisition part 2F1, an output image produced by the production part 2F2, and the like.

The control part 2F6 controls each kind of a component that is provided in the smartphone 2. The control part 2F6 controls each kind of component, and thereby, realizes each kind of process, a process for assisting each kind of process, and the like. The control part 2F6 is realized by, for example, the CPU 2H5 in FIG. 6 or the like.

Here, an entire process is not limited to a case as illustrated in FIG. 7. For example, a part or an entirety of each process may be processed by a device other than a device as illustrated in FIG. 7.

The smartphone 2 produces an editing image and a changing image based on an all celestial sphere image acquired from the image taking device 1 or the like. An editing image is an image for outputting a predetermined area that is determined by a predetermined area T and causes a user to execute an editing operation such as blurring or cancellation of blurring. A changing image is an image for causing a user to execute an operation for changing a position, a size, or a range of a predetermined area T, or the like. The smartphone 2 outputs an output image that has at least an editing image and a changing image. An output image has an editing image and a changing image, and thereby, it is possible for the smartphone 2 to cause a user to execute editing such as blurring and simultaneously change an area output in such an editing image by such a changing image. Therefore, in a case where a user executes a blurring operation for an all celestial sphere image or the like, it is possible for the smartphone 2 to output an image for facilitating an operation. Hence, the smartphone 2 outputs an output image that has an editing image and a changing image, and thereby, it is possible for a user to readily execute an operation of an image.

Here, the smartphone 2 may be realized by a computer-executable program described in a legacy programming language such as Assembler, C, C++, C#, or Java ("Java" is a registered trademark), an object-oriented programming language, or the like. It is possible for a program to be stored in and distributed by a recording medium such as a ROM or an Electrically Erasable Programmable ROM (EEPROM). It is possible for a program to be stored in and distributed by a recording medium such as an Erasable Programmable ROM (EPROM). It is possible for a program to be stored in and distributed by a recording medium such as a flash memory, a flexible disk, a CD-ROM, a CD-RW, a DVD-ROM, a DVD-RAM, a DVD-RW, or the like. It is possible for a program to be stored in a device-readable recording medium such as a Blu-Ray disk ("Blu-Ray disk" is a registered trademark), SD ("SD" is a registered trademark) card, or an MO or distributed through a telecommunication line.

Here, an image in an embodiment is not limited to a still image. For example, an image may be an animation.

Furthermore, a part or an entirety of each process in an embodiment may be realized by, for example, a programmable device (PD) such as a field programmable gate array (FPGA). Moreover, a part or an entirety of each process in an embodiment may be realized by an Application Specific Integrated Circuit (ASIC).

Although preferable practical examples of the present invention have been described in detail above, the present invention is not limited to such particular embodiments and a variety of alterations and modifications are possible within a scope of an essence of the present invention as recited in what is claimed.

APPENDIX

<An Illustrative Embodiment(s) of an Information Processing Method, an Information Processing Device, and a Program>

At least one illustrative embodiment of the present invention may relate to an information processing method, an information processing device, and a program.

At least one illustrative embodiment of the present invention may aim at facilitating execution of an image operation for a user.

According to at least one illustrative embodiment of the present invention, there may be provided an information processing method that causes a computer to process an image, characterized by causing the computer to execute an acquisition step for acquiring the image, a production step for producing an editing image for editing a predetermined area of the image and a changing image for changing the predetermined area to be output, and an output step for outputting an output image that has at least the editing image and the changing image.

Illustrative embodiment (1) is an information processing method for causing a computer to process an image, wherein the image processing method causes the computer to execute an acquisition step for acquiring the image, a production step for producing an editing image for editing a predetermined area of the image and a changing image for changing the predetermined area to be output, and an output step for outputting an output image that has at least the editing image and the changing image.

Illustrative embodiment (2) is the information processing method as described in illustrative embodiment (1), wherein an editing area input step for acquiring an editing area that is a target area of the editing by using the editing image and an editing step for editing the editing area are executed.

Illustrative embodiment (3) is the image processing method as described in illustrative embodiment (2), wherein the editing step is a step for blurring the editing area.

Illustrative embodiment (4) is the information processing method as described in illustrative embodiment (3), wherein an acquisition image that has just been acquired in the acquisition step and a blurred image produced by a blurring process are produced and the output image is output by selecting a pixel of the blurred image for the editing area and a pixel of the acquisition image for that other than the editing area.

Illustrative embodiment (5) is the information processing method as described in any one of illustrative embodiments (2) to (4), wherein a specified area input step for acquiring a specifying area for specifying an area of a part or an entirety of an image output with the editing image and a cancellation step for canceling the editing process executed for the specifying area are executed.

Illustrative embodiment (6) is the information processing method as described in any one of illustrative embodiments (1) to (5), wherein an operation input step for acquiring an operation for changing, enlarging, or reducing the predetermined area that is output with the editing image by using the changing image is executed.

Illustrative embodiment (7) is the information processing method as described in illustrative embodiment (6), wherein a determination step for determining a view point position and a view angle is executed based on the operation and the determination changes one of the view point position and the view angle based on an area indicated by the operation.

Illustrative embodiment (8) is the information processing method as described in any one of illustrative embodiments (1) to (7), wherein a detection step for detecting an attitude of a device that displays the output image and a changing step for changing a position or direction of the changing image based on a result of detection by the detection step are executed.

Illustrative embodiment (9) is an information processing device that processes an image, wherein the image processing device has an acquisition means for acquiring the image, a production means for producing an editing image for editing a predetermined area of the image and a changing image for changing the predetermined area to be output, and an output means for outputting an output image that has at least the editing image and the changing image.

Illustrative embodiment (10) is a program for causing a computer to process an image, wherein the program causes the computer to execute an acquisition step for acquiring the image, a production step for producing an editing image for editing a predetermined area of the image and a changing image for changing the predetermined area to be output, and an output step for outputting an output image that has at least the editing image and the changing image.

According to at least an illustrative embodiment of the present invention, it may be possible to facilitate execution of an image operation for a user.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing method has been described in detail, it should be understood that various changes, substitutions, and alterations could be made thereto without departing from the spirit and scope of the invention.

What is claimed is:

1. An information processing method for causing a computer to process an all celestial sphere panorama image,
wherein the image processing method causes the computer to execute an acquisition step of acquiring the all celestial sphere panorama image, a first production step of producing an editing image for editing at least a portion based on the all celestial sphere panorama image, and producing a first changing image obtained by reducing the all celestial sphere panorama image to be circular in shape, wherein the first changing image is for changing the editing image to be output, a displaying step of displaying both the editing image and the first changing image of the all celestial sphere panorama image on an input/output device connected to the computer, the displayed first changing image being smaller than the displayed editing image, an editing step of editing the celestial sphere panorama image, wherein said editing step is performed at a portion of the input/output device where the produced editing image is displayed, a second production step of producing a second changing image based on an image edited at the editing step, an output step of outputting an output image that has at least the editing image edited at the editing step and the second changing image produced at the second production step to the input/output device to display the edited editing image and the second changing image, and a determining step of determining whether a user action is an operation to edit the all celestial sphere panorama image or an operation to change the all celestial sphere panorama image, based on whether the operation is performed on the editing image or on the changing image, wherein operations on the first changing image displayed on the input/output device that cause changes in the displayed editing image include swiping operations that rotate the displayed editing image and pinching operations that zoom-in or zoom-out the displayed editing image, the swiping operation being initiated from within a region where the first changing image is displayed.

2. The information processing method as claimed in claim 1,
wherein an editing area input step of acquiring an editing area that is a target area of the editing by using the editing image and an editing area editing step of editing the editing area are executed.

3. The image processing method as claimed in claim 2, wherein the editing area editing step is a step of blurring the editing area.

4. The information processing method as claimed in claim 3,
wherein an acquisition image that has just been acquired at the acquisition step and a blurred image produced by a blurring process are produced and the output image is output by selecting a pixel of the blurred image for the editing area and a pixel of the acquisition image for that other than the editing area.

5. The information processing method as claimed in claim 2,
wherein a specified area input step of acquiring a specifying area that specifies an area of a part or an entirety of an image output with the editing image and a cancellation step of canceling the editing process executed for the specifying area are executed.

6. The information processing method as claimed in claim 1,
wherein an operation input step of acquiring an operation that changes, enlarges, or reduces the at least a portion of the image that is output with the editing image by using the changing image is executed.

7. The information processing method as claimed in claim 6, wherein a determination step of determining a view point position and a view angle is executed based on the operation and the determination changes one of the view point position and the view angle based on an area indicated by the operation.

8. The information processing method as claimed in claim 1,
wherein a detection step of detecting an attitude of a device that displays the output image and a changing step of changing a position or direction of the first changing image based on a result of detection by the detection step are executed.

9. The image processing method as claimed in claim 1, wherein the editing image is displayed as a reduced image on the input/output device.

10. The image processing method as claimed in claim 1 further comprising:
detecting an operation on the changing image,
calculating a position of a predetermined area corresponding to the location where the operation on the changing image occurred, and
updating the displayed editing image to display the predetermined area calculated from the changing image.

11. The image processing method as claimed in claim 1 further comprising:
detecting an operation on the editing image,
calculating coordinates of a point corresponding to the operation on the editing image and calculating corresponding,
calculating a pixel that is a point specified by the operation on the editing image, wherein the calculated pixel is selected as an object to be subjected to an editing process.

12. The image processing method as claimed in claim 1, wherein:
the editing image of the first production step is defined by a predetermined view angle and a predetermined distance to coordinates of a central point of the all celestial sphere image.

13. An information processing device that processes an all celestial sphere panorama image,
wherein the information processing device has
an acquisition part that acquires the all celestial sphere panorama image,
a first production part that produces an editing image for editing at least a portion based on the all celestial sphere panorama image, and producing a first changing image obtained by reducing the all celestial sphere panorama image to be circular in shape, wherein the first changing image is for changing the editing image to be output,
an input/output device on which both the editing image and the first changing image of the all celestial sphere panorama image are displayed, the displayed first changing image being smaller than the displayed editing image,
an editing part that edits the celestial sphere panorama image, wherein said editing step is performed at a portion of the input/output device where the produced editing image is displayed, a second production part produces a second changing image based on an image edited in the editing part, and an output part that outputs an output image that has at least the editing image edited in the editing part and the second changing image produced in the second production part to the input/output device to display the edited editing image and the second changing image, and a determining part that determines whether a user action is an operation to edit the all celestial sphere panorama image or an operation to change the all celestial sphere panorama image, based on whether the operation is performed on the editing image or on the changing image, wherein operations on the first changing image displayed on the input/output device that cause changes in the displayed editing image include swiping operations that rotate the displayed editing image and pinching operations that zoom-in or zoom-out the displayed editing image, the swiping operation being initiated from within a region where the first changing image is displayed.

14. The information processing device that processes an all celestial sphere panorama image as claimed in claim 13, wherein:

the editing image produced by the first production part is defined by a predetermined view angle and a predetermined distance to coordinates of a central point of the all celestial sphere image.

15. A computer-readable, non-transitory medium storing a program for causing a computer to process an all celestial sphere panorama image, wherein the program causes the computer to execute an acquisition step of acquiring the all celestial sphere panorama image, a first production step of producing an editing image for editing at least a portion based on the all celestial sphere panorama image, and producing a first changing image obtained by reducing the all celestial sphere panorama image to be circular in shape, wherein the first changing image is for changing the editing image to be output, a displaying step of displaying both the editing image and the first changing image of the all celestial sphere panorama image on an input/output device connected to the computer, the displayed first changing image being smaller than the displayed editing image, an editing step of editing the celestial sphere panorama image, wherein said editing step is performed at a portion of the input/output device where the produced editing image is displayed, a second production step of producing a second changing image based on an image edited at the editing step, and an output step of outputting an output image that has at least the editing image edited at the editing step and the second changing image produced at the second production step to the input/output device to display the edited editing image and the second changing image, and a determining step of determining whether a user action is an operation to edit the all celestial sphere panorama image or an operation to change the all celestial sphere panorama image, based on whether the operation is performed on the editing image or on the changing image, wherein operations on the first changing image displayed on the input/output device that cause changes in the displayed editing image include swiping operations that rotate the displayed editing image and pinching operations that zoom-in or zoom-out the displayed editing image, the swiping operation being initiated from within a region where the first changing image is displayed.

16. The computer-readable, non-transitory medium storing a program for causing a computer to process an all celestial sphere panorama image as claimed in claim 15, wherein:

the editing image of the first production step is defined by a predetermined view angle and a predetermined distance to coordinates of a central point of the all celestial sphere image.

* * * * *